United States Patent
Stopher et al.

(10) Patent No.: US 12,311,705 B2
(45) Date of Patent: May 27, 2025

(54) DISTRIBUTED STORAGE AND PROCESSING OF VEHICLE SENSOR DATA, INCLUDING TIRE PRESSURE DATA

(71) Applicant: Cypress Semiconductor Corporation, San Jose, CA (US)

(72) Inventors: Nicholas Stopher, Novi, MI (US); Bradley Evans, Northville, MI (US)

(73) Assignee: Cypress Semiconductor Corporation, San Jose, CA (US)

( * ) Notice: Subject to any disclaimer, the term of this patent is extended or adjusted under 35 U.S.C. 154(b) by 245 days.

(21) Appl. No.: 17/958,240

(22) Filed: Sep. 30, 2022

(65) Prior Publication Data
US 2024/0109377 A1    Apr. 4, 2024

(51) Int. Cl.
B60C 23/04    (2006.01)
G07C 5/00    (2006.01)
H04W 4/80    (2018.01)

(52) U.S. Cl.
CPC ........ B60C 23/0422 (2013.01); B60C 23/041 (2013.01); G07C 5/008 (2013.01); H04W 4/80 (2018.02)

(58) Field of Classification Search
CPC ... B60C 23/0422; B60C 23/041; G07C 5/008; H04W 4/80
USPC ........................................................ 701/31.4
See application file for complete search history.

(56) References Cited

U.S. PATENT DOCUMENTS

| | | | | |
|---|---|---|---|---|
| 6,469,621 | B1 * | 10/2002 | Vredevoogd | B60C 23/0408 340/447 |
| 2002/0075145 | A1 * | 6/2002 | Hardman | B60C 23/0479 340/448 |
| 2004/0113765 | A1 * | 6/2004 | Suitsu | B60C 23/0442 340/445 |
| 2009/0184813 | A1 * | 7/2009 | Lu | B60C 23/0408 340/447 |
| 2018/0031066 | A1 * | 2/2018 | Lin | F16D 66/024 |
| 2018/0050571 | A1 * | 2/2018 | Usami | H04B 1/3822 |
| 2021/0370797 | A1 * | 12/2021 | Brumley, Jr. | B60L 58/22 |
| 2022/0332152 | A1 * | 10/2022 | Fu | B60C 23/0437 |

FOREIGN PATENT DOCUMENTS

WO    WO-9952722 A1 * 10/1999    ......... B60C 23/0433

* cited by examiner

*Primary Examiner* — Isaac G Smith

(57) ABSTRACT

A method can include generating analog signals from at least one pressure sensor mounted within a tire; by operation of analog-to-digital conversion (ADC) circuits of the pressure sensor, converting the analog signals into initial tire data; transmitting the initial tire data from the pressure sensor according to a first wireless communication protocol; receiving the initial tire data at a first intermediate device according to the first wireless standard, the intermediate device being disposed outside of the tire; and storing the initial tire data in the first intermediate device. By operation of the first intermediate device, relayed tire data configured for reception by a central tire monitoring system can be transmitted. The relayed tire data can correspond to the initial tire data. Corresponding devices and systems are also disclosed.

19 Claims, 12 Drawing Sheets

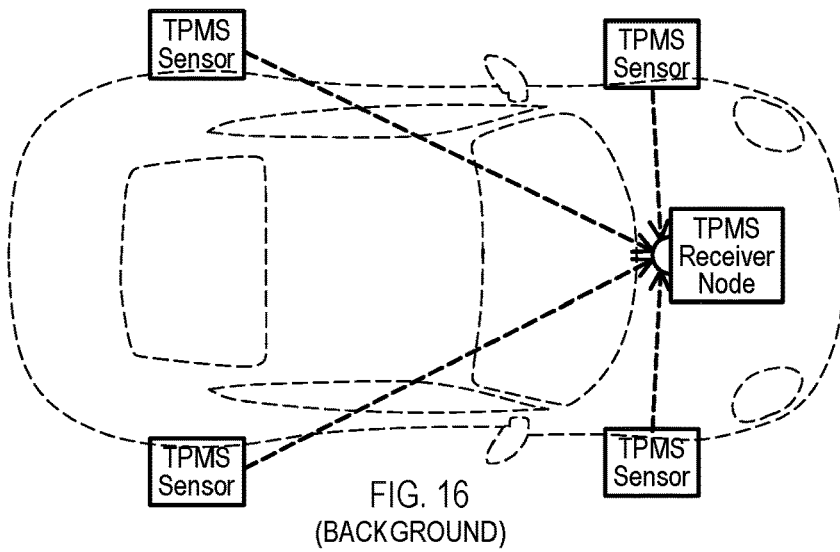
FIG. 16
(BACKGROUND)
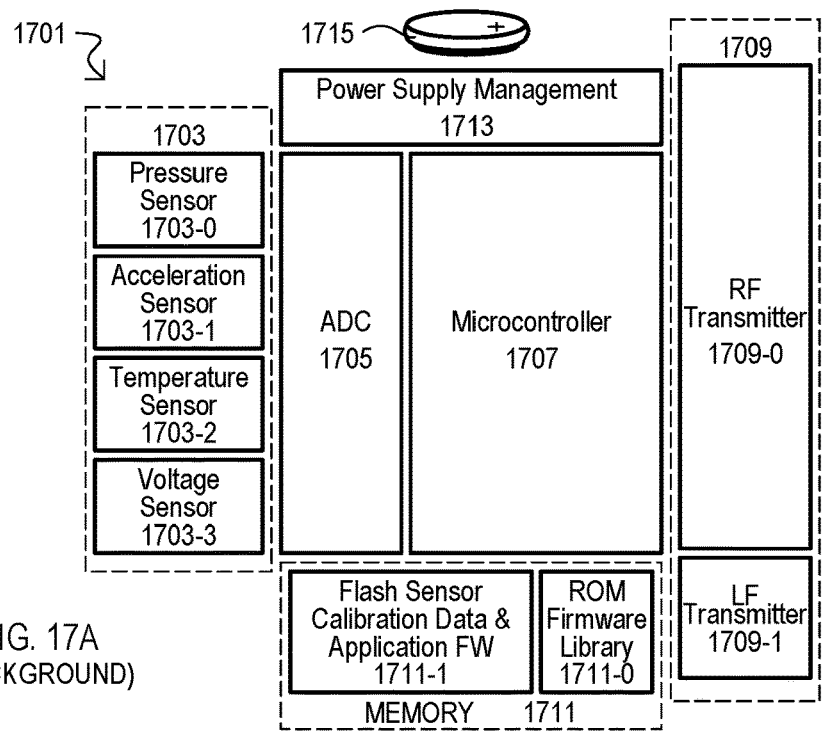
FIG. 17A
(BACKGROUND)
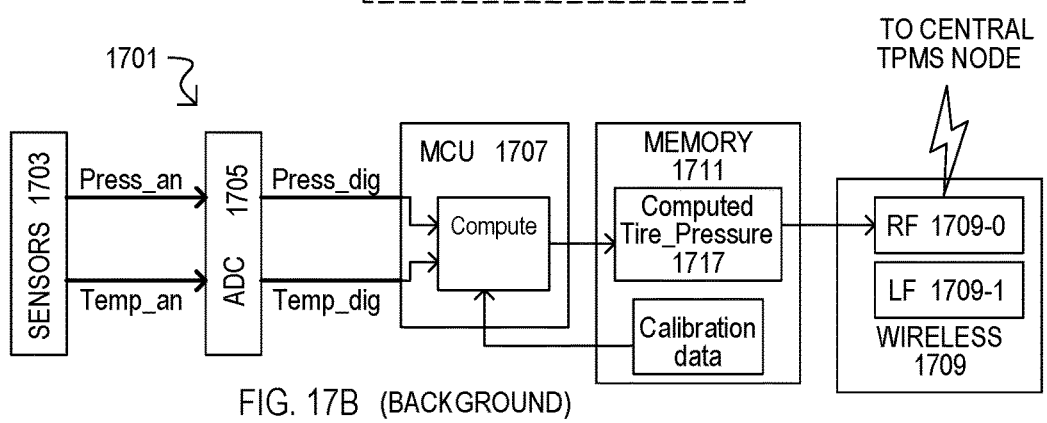
FIG. 17B (BACKGROUND)

DISTRIBUTED STORAGE AND PROCESSING OF VEHICLE SENSOR DATA, INCLUDING TIRE PRESSURE DATA

TECHNICAL FIELD

The present disclosure relates generally to sensor systems for monitoring vehicle states, and more particularly to a system for the distributed storage and processing of sensor data, including tire pressure data.

BACKGROUND

FIG. 16 shows a conventional tire pressure monitoring system (TPMS). TPMS sensors are mounted within each tire and communicate directly with a central TPMS receiver node. TPMS sensors can periodically generate tire pressure values and transmit them to the central TPMS receiver node. To better understand features of the disclosed embodiments, a conventional TPMS sensor and operation is shown in a FIGS. 17A and 17B.

Referring to FIG. 17A, a conventional TPMS sensor 1701 can include sensors 1703, an analog-to-digital converter (ADC) 1705, microcontroller 1707, wireless circuits 1709, memory circuits 1711 and power supply management circuits 1713. Sensors 1703 include a pressure sensor 1703-0, acceleration sensor 1703-1, temperature sensor 1703-2 and voltage sensor 1703-3. Sensors 1703 generate analog values corresponding to a sensed state.

ADC 1705 can convert analog values from sensors (1703-0 to -3) into digital values. A microcontroller 1707 can control operations of the TPMS sensor 1701, as will be described. Wireless circuits 1709 can include RF transmitter 1709-0 and LF receiver 1709-1. RF transmitter 1709-0 transmits tire pressure readings to a central TPMS node at a relatively high frequency (300-400 MHz). LF receiver 1709-1 can receive input signals at a relatively low frequency (125 kHz). Memory circuit 1711 can include a ROM firmware library 1711-0 as well as flash sensor calibration data and application firmware 1711-1. Power supply management circuits 1713 can control power for the TPMS sensor 1701, which is limited, as power is provided by a battery 1715.

FIG. 17B shows operations of a conventional TPMS sensor 1701. Sensors 1703 provide analog signals for tire pressure, including an analog pressure reading (Press_an) and an analog temperature reading (Temp_an). Such values can be converted to digital values (Press_dig, Temp_dig) by ADC 1705. MCU 1707 can execute computations on digital values (Press_dig, Temp_dig) using other stored values (calibration data) to generate a computed tire pressure 1717. Such calculations can include correcting for non-linear effects and/or digital filtering. A computed tire pressure 1717 is stored in memory circuits 1711 and then transmitted by RF transmitter 1709-0 directly to a central TPMS node (which can be located in an infotainment/Head Unit/Cluster of a vehicle}.

While conventional TPMS sensors can enable a highly valued vehicle feature, because they are battery powered, their lifetime is limited. Thus, any improvement to TPMS sensor lifetime would be a highly valued improvement to vehicle systems.

SUMMARY

Embodiments can include systems, methods and devices that include multiple sensors that acquire state data for a vehicle. The storage and processing of such state data can then be distributed over one or more intermediate devices before being transmitted to a central destination. In some embodiments, tire pressure sensors can wirelessly transmit tire pressure and related data to one or more intermediate devices, which can store such data and/or execute computations on such data. Such tire related data can then be relayed from intermediate devices to a central tire pressure monitoring system (TPMS), either directly or indirectly. The ability to move tire pressure sensor functions to other devices can enable the use of "lite" tire pressure sensors (i.e., TPMS_L sensors) that do not include the storage and/or computation circuits present in conventional TPMS sensors. Such TPMS_L sensors can have a significantly lower power consumption (and hence longer lifetime) than conventional TPMS sensors.

In some embodiments, TPMS_L sensors can communicate according to one or more Bluetooth protocols.

In some embodiments, sensors and intermediate devices can form a wireless network for a vehicle. A topography of such a network (e.g., communication paths between nodes) can change according to vehicle state. Such a feature can enable the use of available storage/computation capabilities of intermediate devices, that might otherwise be idle, or underutilized.

BRIEF DESCRIPTION OF THE DRAWINGS

FIG. 16 is a diagram of a conventional TPMS system.

FIGS. 17A and 17B are diagram showing a conventional TPMS sensor and operations.

DETAILED DESCRIPTION

According to embodiments, a vehicle or other system can include multiple sensors that acquire state data that is used by a central node for analysis and other operations (e.g., monitoring, display). Sensors can wirelessly transmit acquired state data to intermediate devices, which can store such data and/or execute computations on such data. Intermediate devices can then forward sensor data to a central node over one or more wireless connections, wired connections, or a combination thereof.

In some embodiments, sensors can be "lite" tire pressure monitoring system (TPMS_L) sensors, and intermediate devices can be other types of sensors or devices. TPMS_L sensors can be sensors with fewer components and/or lower power consumption than conventional TPMS sensors. In some embodiments, TPMS_L sensors and intermediate sensors can be in communication over Bluetooth compatible connections.

In some embodiments, the distribution of tire pressure monitoring storage and computation operations to other devices can be dynamically changed according to the state of a vehicle.

Figure 1A:
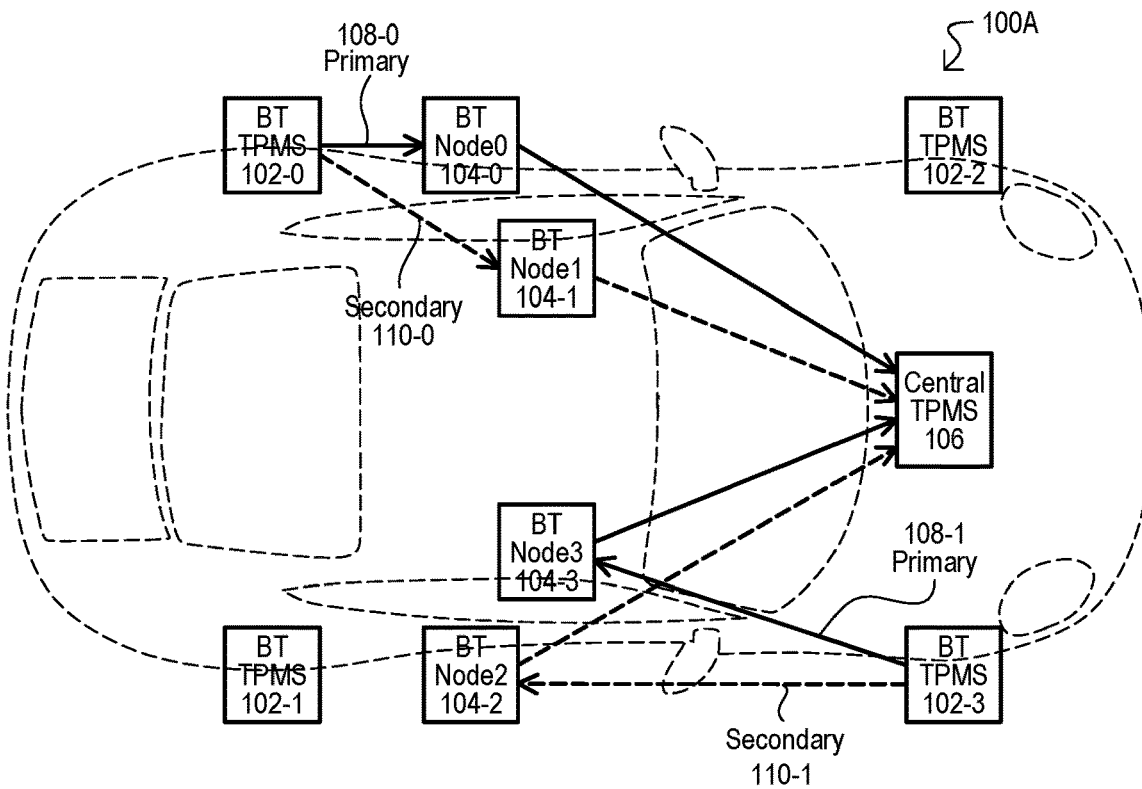
FIGS. 1A and 1B are diagrams showing vehicle systems for transmitting tire pressure data according to embodiments.

FIG. 1A is a diagram of a vehicle system 100A according to an embodiment. A system 100A include TPMS_L sensors 102-0 to 102-3, intermediate devices (four shown as 104-0 to 104-3), and a central TPMS node 106. TPMS_L sensors (102-0 to -3) can each be positioned within a different tire, and can generate raw tire sensor data. Raw tire sensor data can require some additional computation to arrive at a tire pressure value usable by a central TPMS node 106. In some embodiments, raw tire sensors data can be inaccurate absent such additional computation. As but two of many examples, raw tire pressure can be non-linear or may need to be adjusted according to the particular features of the TPMS_L sensor (e.g., calibrated). TPMS_L sensors (102-0 to -3) can wirelessly transmit raw tire sensor data according to one or more wireless protocol. In some embodiments, such a wireless protocol can be one or more Bluetooth standards, including Bluetooth Low Energy (BLE). In some embodiments, TPMS_L sensors (102-0 to -3) may not store raw tire sensor data after transmission, such as in a nonvolatile memory or a volatile memory that must remain under battery power to retain stored data.

Intermediate devices (104-0 to -3) can be other sensors (i.e., not tire sensors) or devices that have other functions in the vehicle system 100A. Intermediate devices (104-0 to -3) can wirelessly communicate with TPMS_L sensors (102-0 to 102-3). While such communications can include the reception of raw tire sensor data, in some embodiments, such communications can also include the transmission of configuration data from an intermediate device (104-0 to -3) to one or more TPMS_L sensors (102-0 to -3). Such configuration data can establish communication links between devices or otherwise establish how wireless communications occur. In some embodiments, intermediate devices can receive configuration data from another source, such as TPMS node 106. Intermediate device (104-0 to -3) can be any suitable device, including but not limited to: seatbelt related sensors (click detection, tension); phone-as-a-key (PaaK) type sensor, door handle sensors, occupancy sensors, or a battery management system (BMS).

While intermediate devices (104-0 to -3) can have various functions unrelated to tire pressure data, in a vehicle system 100A intermediate devices (104-0 to -3) can store raw tire sensor data received wirelessly from one or more TPMS_L sensors (102-0 to -3) and relay tire pressure data to a central TPMS node 106. In some embodiments, an intermediate device (104-0 to -3) can perform computations with the raw tire sensor data prior to relaying it on to a central TPMS node 106. While intermediate devices (104-0 to -3) can communicate wirelessly with TPMS_L sensors (102-0 to -3), such intermediate device can use any suitable communication method for communicating with a central TPMS node 106, including directly or indirectly (i.e., via a third device between the intermediate node and a central TPMS node). Further, such a connection from an intermediate device to a central TPMS node 106 can be wired or wireless. As but one example, an intermediate device (104-0 to -3) can be connected to a core network of a vehicle, and can forward tire pressure data via the core network.

Referring still to FIG. 1A, examples of tire pressure data flows will be described. It is understood such a description is provided by way of example and should not be construed as limiting. A TPMS_L sensor 102-0 can generate raw tire sensor data. Such data can be transmitted via a primary wireless connection 108-0 to intermediate device 104-0. In some embodiments, such a connection can be a Bluetooth connection. Further, in some embodiments, TPMS_L sensor 102-0 can transmit such data without storing the data, or without storing the data in a nonvolatile fashion. Intermediate device 104-0 can store the raw tire sensor data, optionally execute computations on such data, and then forward tire pressure data to central TPMS node 106. Such transmission can be via a wireless or wired connection.

In the embodiment shown, a TPMS_L sensor 102-0 can also have a secondary wireless connection 110-0 to another intermediate device 104-1. Primary and secondary wireless connections 108-0/110-0 can represent different "profiles" for the system 110A, as will be described in more detail herein. In addition or alternatively, a secondary connection 110-0 can represent an alternate connection that can be used if a primary connection 108-0 is determined not to be working (e.g., an acknowledgement (ACK) is not received from intermediate device 104-0). FIG. 1A also shows primary and secondary connections 108-1/110-1 for TPMS_L sensor 102-3. It is understood that such connections can exist for the other TPMS_L sensors (102-1, 102-2).

In this way, tire pressure sensor readings can be wirelessly transmitted to one or more intermediate devices, which can store and/or execute computations on such data prior to forwarding the tire pressure information to a central node.

While a system can include direct predetermined connections between TPMS_L sensors, as shown in FIG. 1A, alternate embodiments can include a mesh type network. An example of such an embodiment is shown in FIG. 1B.

Figure 1B:
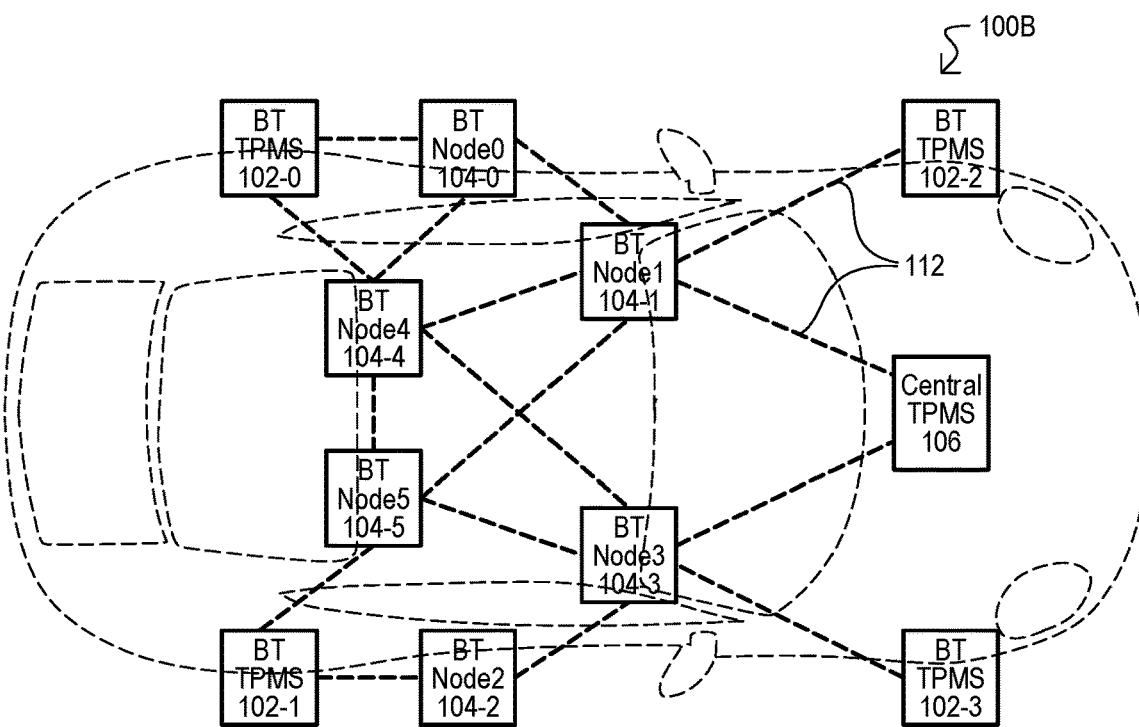

FIG. 1B shows a vehicle system 100B in which TPMS_L sensors (102-0 to -3), intermediate devices 104-0 to 104-5, and optionally a central TPMS node 106, can form a wireless mesh-type network, where wireless connections (two shown as 112) exist between devices proximate to one another, or as established by configuration data. In some embodiments, such a mesh network can be compatible with one or more Bluetooth standards. In some embodiments, a system 100B can include TPMS_L sensors (102-0 to -3) broadcasting raw tire sensor data (e.g., transmit with a broadcast destination address) and time-to-live (TTL) type data. Further, intermediate devices (104-0 to -5) can cache received data to not repeat transmissions. Connections to a TPMS central node 106 can be via the mesh network or via another network (e.g., core network).

In this way, a vehicle can include BT nodes in a mesh or direct configuration which can have authorization to communicate tire pressure information. Because tire pressure data can be less sensitive than other vehicle sensor data, in some embodiments, tire pressure data can be transmitted/ relayed when there is a suitable opportunity, rather than at a dedicated time or interval established by the tire sensors.

In this way, embodiments can leverage other BT devices scattered around a vehicle to perform tire pressure data storage, transmission and/or computation. Tire pressure data can flow directly from tire pressure sensors to other BT devices (e.g., devices with BT chips around the "beltline" of the vehicle). A vehicle can include a "backhaul" network of intermediate devices to support transmission of data from sensors to a central TPMS node. In some embodiments, the storage and processing of tire pressure data can be performed utilizing other BT nodes normally allocated to other functions (e.g., PaaK, seatbelts, wireless door handles, BMS, etc.).

On the other hand, while embodiments have been described in terms of Bluetooth compatible wireless connections, any suitable wireless protocol/standard can be used to transmit data from TPMS_L sensors and intermediate devices, including but not limited to: Zigbee, IEEE 802.11ah ("HaLow"), Z-wave, or a proprietary standard.

Figure 2:
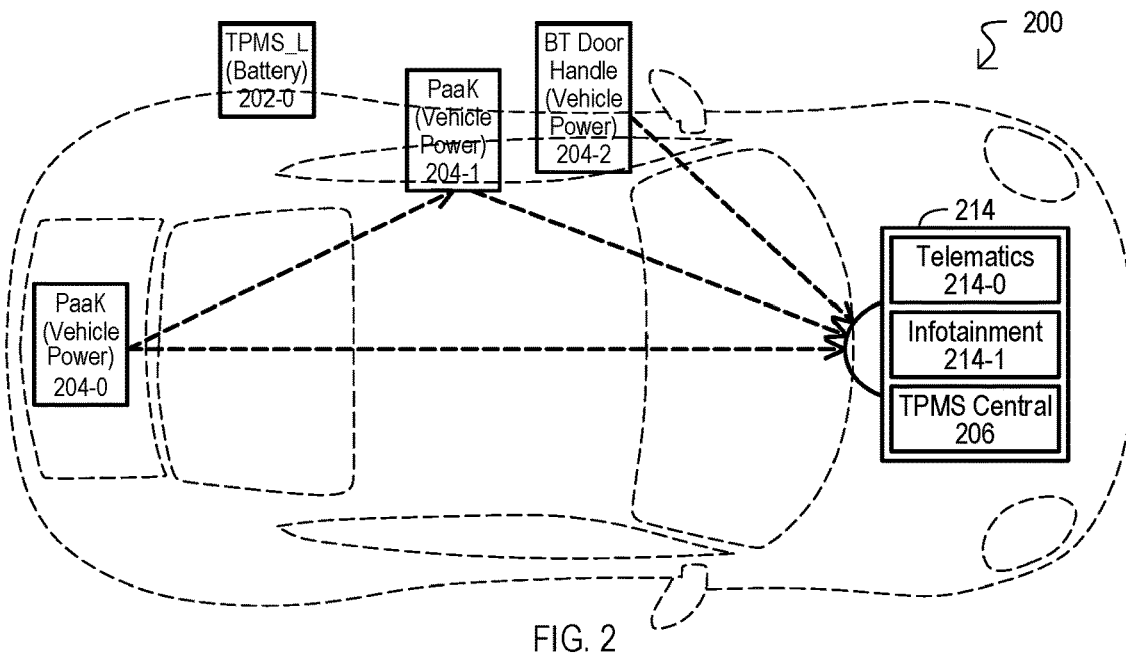
FIG. 2 is a diagram a vehicle system for transmitting tire pressure data with devices having different power sources according to an embodiment.

According to embodiments, TPMS_L sensors, which can be powered by a local battery, can transmit tire pressure data to intermediate devices that are, or can be, connected to the system power of a vehicle. FIG. 2 shows one example of such an embodiment. Thus, intermediate devices that relay tire pressure data may not suffer from power limitations of TPMS_L sensors that rely on smaller capacity batteries.

FIG. 2 shows a vehicle system 200 that can include multiple TPMS_L sensors (one shown as 202-0), intermediate devices 204-0 to 204-2 and a central node 214. TPMS_L sensor 202-0 can receive power from its own battery, and thus have a finite lifetime. However, as described herein, such a lifetime can be significantly increased over conventional TPMS sensors as various functions, including data storage and/or data computation, can be distributed to one or more other intermediate devices (204-0 to -2).

Any or all of intermediate devices (204-0 to -2) can receive tire pressure sensor data from a TPMS_L sensor (e.g., 202-0), store such data, and in some embodiments process such data. Some or all of the intermediate devices (204-0 to -2) can be powered by the vehicle power system. In the embodiment shown, intermediate devices can include PaaK sensors 204-0, 204-1 as well as a door handle sensors 204-2. Because such intermediate devices (204-0 to -2) can be powered by a vehicle power system, tire pressure data storage and/or data processing can be given potentially unlimited power, as opposed to the limited power of a TPMS sensor battery. Intermediate devices (204-0 to -2) can be in communication with central node 214, either directly or indirectly. Further such communication can be via one or more wireless links and/or wired links, including a core network of a vehicle.

A central node 214 can include various systems, including a telematics system 214-0, infotainment system 214-1 and a TPMS central node 206. A telematics system 214-0 can include any suitable telematic functions, including but not limited to: navigation (GPS, cellular positioning); safety (assistance, on-board diagnostics), security (authentication), or communication (cellular, satellite, wireless). An infotainment system 214-1 can provide any suitable infotainment functions, including but not limited to: radio, audio/video streaming, media interfaces or human interfaces (e.g., touchscreen). A TPMS central node 206 can receive tire pressure and related data and monitor, evaluate and/or display such data. In some embodiments, intermediate devices (204-0 to -2) can perform computations such that the tire pressure data are in a form for immediate use by a TPMS central node 206. However, in other embodiments, a TPMS central node 206 can also perform some computation on tire pressure data received from intermediate devices (204-0 to -2).

In some embodiments, FIG. 2 can be one example of any of the systems shown in FIG. 1A or 1B.

In this way, tire pressure sensor functions, such as data storage and/or data processing can be distributed to vehicle powered devices.

According to embodiments, tire pressure sensors can employ a wireless protocol/standard optimized for relatively shorter ranges that those used by conventional TPMS systems, as tire pressure data can be transmitted to intermediate devices that are in closer range than a central TPMS node.

Figure 3:
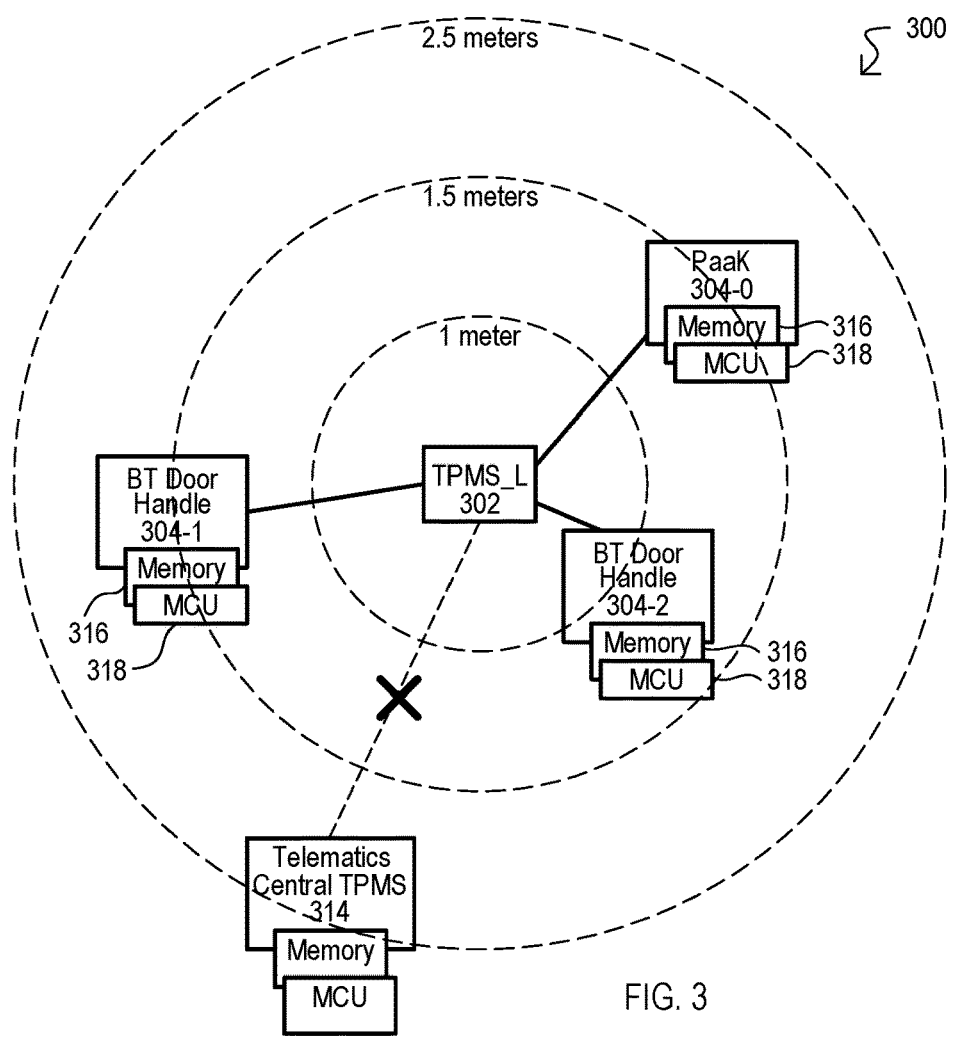
FIG. 3 is a diagram showing tire pressure transmission ranges to other devices in a vehicle system, according to embodiments.

FIG. 3 is a diagram showing a distance from a TPMS_L sensor 302 to other devices of a vehicle system 300. In the embodiment shown, a TPMS_L sensor 302 can be a relatively short distance (e.g., 1 meter) from an intermediate device 304-2, which can be a BT door handle sensor, and a moderate distance (e.g., 1.5 meters) from other intermediate devices 304-0/1 which can be another BT door handle sensor 304-1 and a PaaK sensor 304-0. TPMS_L sensor 302 can be a relatively far distance (e.g., 2.5 meters) to a central node 314, which can include a central TPMS node as well as other systems (e.g., telematics).

A TPMS_L sensor 302 can use a communication protocol designed for relatively shorter distances, such as Bluetooth or any other such standard described herein. As such, a TPMS_L sensor 302 can reliably transmit tire pressure and related data to any of the intermediate devices 304-0, 304-1 and 304-2. However, unlike a conventional system, a TPMS_L sensor 302 may not transmit tire pressure data directly to a central TPMS node 314 located at the farther distance. By transmitting tire pressure and related data to intermediate devices in close proximity, a TPMS_L sensor 302 can transmit at relatively low power and/or according to a low power protocol/standard (e.g., BLE).

Referring still to FIG. 3, intermediate devices (304-0 to -2) can include memory circuits 316 and a microcontroller (MCU) 318. Memory circuits 316 can store tire pressure and related data received wirelessly from a TPMS_L sensor. A MCU 318 can perform computations on received (e.g., raw) tire pressure values to generate processed tire data that can be forwarded to a central TPMS node 314. As noted herein, this distribution of conventional TPMS sensor functions to other devices can add to power savings for the transmitting TPMS_L sensor.

According to embodiments, tire pressure sensors (e.g., TPMS_L sensors) can broadcast tire pressure data where nearby nodes, normally allocated to other tasks, can receive, store, perform calculations and retransmit tire pressure data to a central TPMS node, which can be located at any suitable location of the vehicle.

In some embodiments, FIG. 3 can be one example of any of the systems shown In FIG. 1A, 1B or 2.

In this way, tire pressure sensors can use lower range and/or lower power transmissions to send tire pressure and related data to intermediate devices that are closer than a central TPMS node. Intermediate devices can then forward tire pressure data to a central TPMS node.

According to embodiments, intermediate devices that relay sensor data, such as tire pressure sensor data, can take various forms and perform various functions in a vehicle system. Different types of intermediate devices will now be described with reference to a number of block diagrams.

Figure 4A:
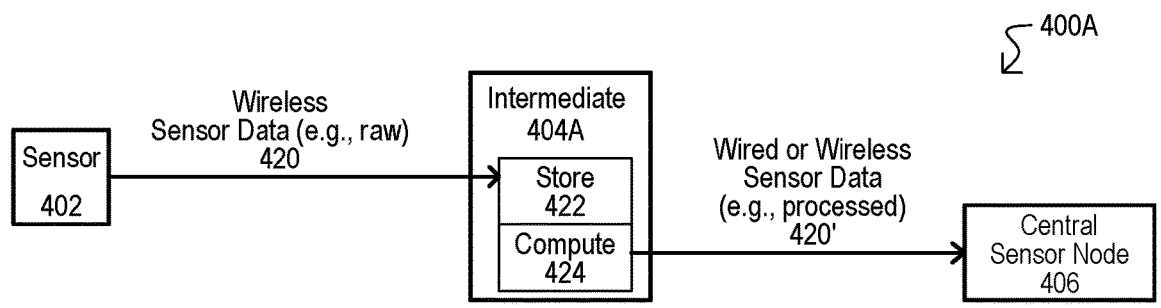
FIGS. 4A to 4C are diagrams showing intermediate devices and operations in a vehicle system according to embodiments.

FIG. 4A shows a system 400A according to an embodiment. A system 400A can include sensors (one shown as 402), intermediate devices (one shown as 404A) and a central sensor node 406. A sensor 402 can generate sensor reading data, and transmit such data to an intermediate device 404A. A sensor 402 can be a TPMS sensor, and in some embodiments can be a TPMS_L sensor as described herein, or equivalents.

Wirelessly transmitted sensor data 420 can be received, directly or indirectly, by intermediate device 404A. Intermediate device 404A can execute a storage function 422 to store the sensor data 420. In some embodiments, such a function can include storing such data in nonvolatile memory circuits. Intermediate device 404A can also execute a computation function 424. A computation function 424 can process stored sensor data to generate processed sensors data 420'. Such computations can include any suitable operations, including but not limited to: calibration operations (including removing non-linear effects), digital filtering and scaling. Such computations can utilize values received from a sensor 402 and/or stored by the intermediate device 404A. Processed sensors data 420' can then be transmitted, directly or indirectly, to a central sensor node 406. In some embodiments, a central sensor node 406 can be a central TPMS node.

Figure 4B:
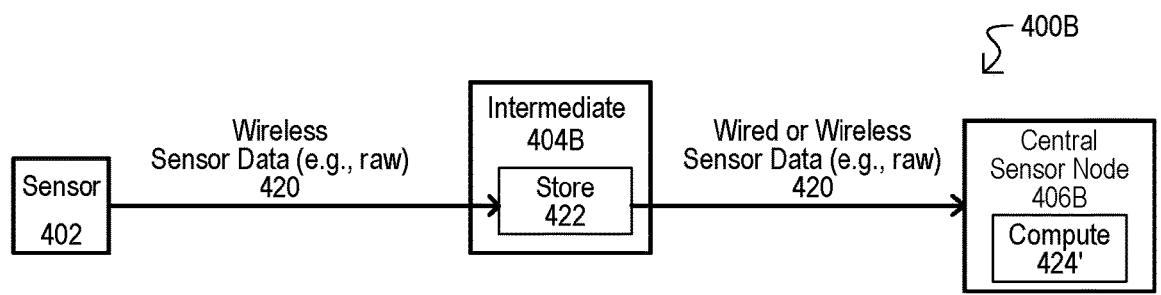

FIG. 4B shows a system 400B according to another embodiment. A system 400B can include items like those of FIG. 4A. FIG. 4B can differ in that an intermediate device 404B can have a storage function 422 but not a computation function. Thus, intermediate device 404B can serve to relay sensor data 420 to a central sensor node 406B. Central sensor node 406B can include a computation function 424' to execute operations to process sensor data into a form compatible for the system (e.g., for evaluation and/or display).

Figure 4C:
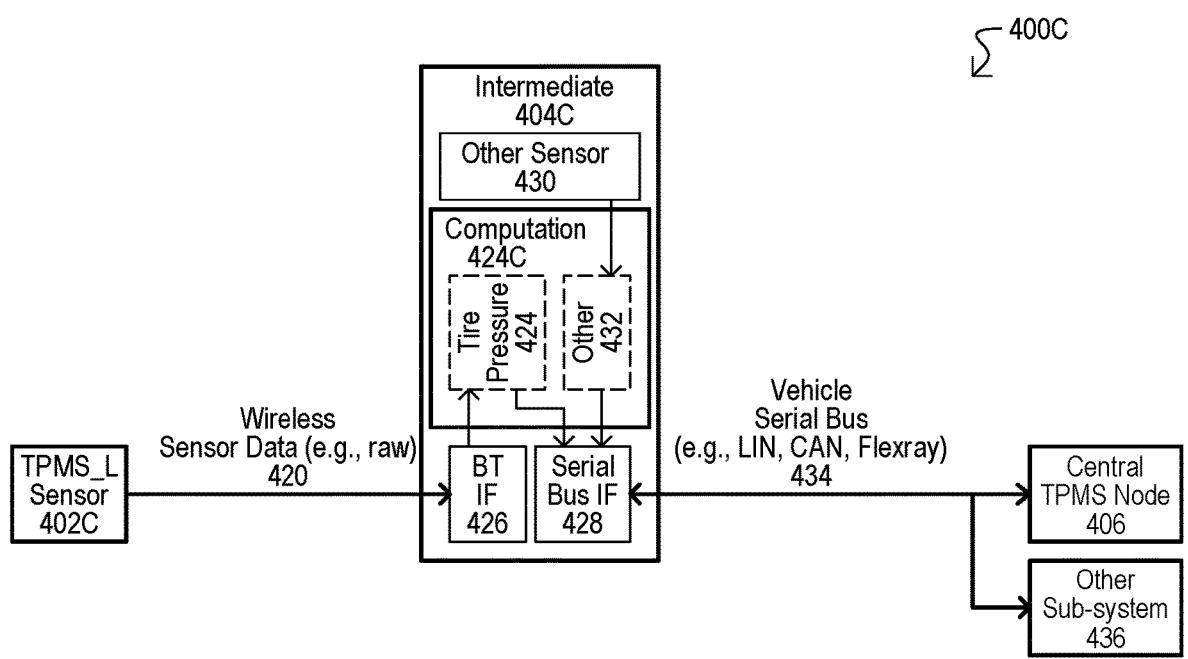

FIG. 4C shows a system 400C according to another embodiment. A system 400C can include TPMS_L sensors (one shown as 402C), an intermediate device 404C, a central TPMS node 406 and another sub-system 436. A TPMS_L sensor 402C can generate tire pressure and related data as described herein, and equivalents. Such sensor data 420 can be transmitted wirelessly to intermediate device 404C.

Intermediate device 404C can execute one or more other functions (i.e., functions that are not related to tire pressure) in a vehicle system. In the embodiment shown, intermediate device can include another sensor 430, a BT interface (IF) 426, a serial bus IF 428, and can include circuits for executing a computation functions 424C. Other sensor 430 can sense a vehicle state for some other functions (e.g., PaaK, seatbelt state, occupancy detection, door handle sensor, vehicle battery state). A BT IF 426 can receive sensor data 420 from TPMS_L sensor 402C, and in some embodiments, other BT nodes. As will be described herein, in some embodiments, BT IF 426 can also be used to transmit configuration and other data to a TPMS_L sensor 402C. A serial bus IF 428 can be an interface for a vehicle serial bus, and can be compatible with any suitable serial bus protocol/standard, including but not limited to a controller area network (CAN) type bus, local interconnect network (LIN) type bus or a Flexray type bus.

Computation functions 424C can include tire pressure computations 424 and other computations 432 related to other sensor 430. Such computations 424/432 can be performed in parallel with suitable hardware, or can be performed at different times and/or according to different priorities or vehicle states. As but one example, other computations 432 may be more time critical than tire pressure data, and so can be performed with priority over tire pressure data computations 424. As but another example, in one state a system 400C may rarely utilize other sensor 430 and so tire pressure computations 424 can take precedent until a vehicle state changes.

Intermediate device 404C can be connected via serial IF 428 to a vehicle serial bus 434, either directly or indirectly. A serial bus 434 can take any suitable form as described herein. Intermediate device 404C can transmit computed tire pressure to a central TPMS node 406 over serial bus 434. In addition, intermediate device 404C can transmit other computed data corresponding to other sensor 430 to another sub-system 436 for evaluation or other operations.

In this way, an intermediate devices can receive sensor data wirelessly and relay such data to a central destination. Intermediate devices may or may not perform computations on received sensor data. Intermediate devices can perform other functions with computation resources, and can use the same computation resources for processing tire pressure data.

While FIGS. 1A to 4C show intermediate devices as BT compatible devices, as noted herein, such devices can receive tire pressure data from a TPMS_L sensors according to any other suitable wireless protocol/standard.

Figure 5:
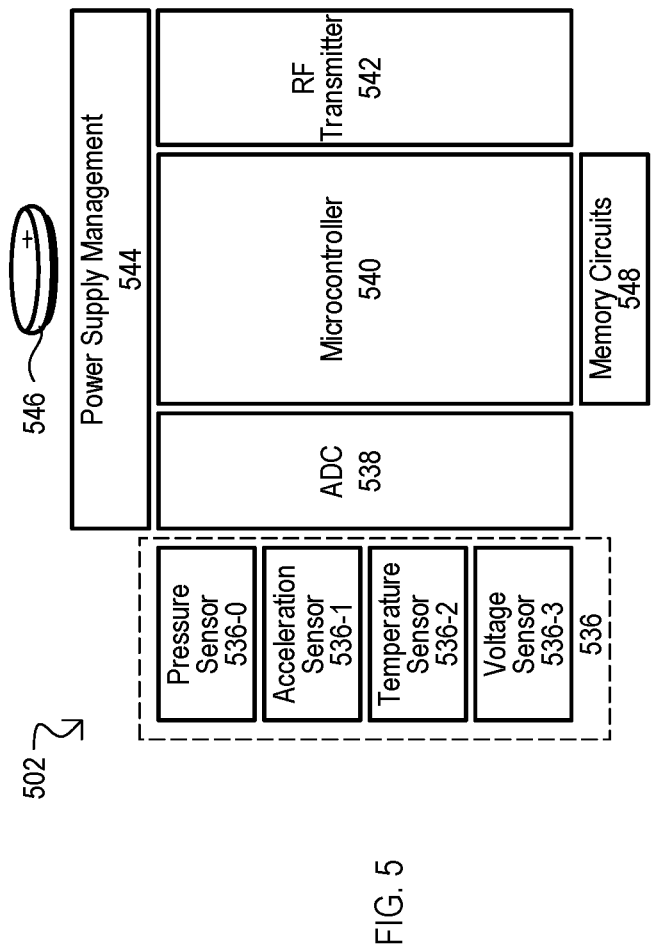
FIG. 5 is a block diagram of a "lite" tire pressure monitoring system (TPMS_L) sensor according to an embodiment.

FIG. 5 shows a TPMS_L sensor 502 according to an embodiment. A TPMS_L sensor 502 can be configured for mounting in a tire. In some embodiments, such a mounting can be the same as or equivalent to a conventional TPMS sensor. A TPMS_L sensor can include a sensor section 536, an analog-to-digital converter (ADC) 538, MCU 540, memory circuits 548, RF transmitter 542, power supply management 544 and battery 546. Sensor section 536 can include a pressure sensor 536-0, acceleration sensor 536-1, temperature sensor 536-2 and voltage sensor 536-3. Analog values generated by sensor section 536 can be converted into digital values by ADC 538.

MCU 540 can control operations of a TPMS_L sensor 502. In some embodiments, MCU 540 can perform substantially simpler tasks than the MCU of a conventional TPMS sensor. A MCU 540 can control the transfer of digital sensor data from ADC 538 to RF transmitter 542 for transmission, and can configure RF transmitter 542 for different profiles. In some embodiments, a MCU 540 can be free of conventional functions, such as controlling the storage of digital sensor data and executing computations on digital sensor data. Accordingly, a MCU 540 or logic circuit equivalent, can be substantially smaller, simpler, and consume less power than in a conventional TPMS sensor. Along these same lines, memory circuits 548 can be substantially smaller, as a MCU instruction set can provide fewer functions.

A TPMS_L sensor 502 can include an RF transmitter 542 which can both receive and transmit over the same media. This is in contrast to a conventional TPMS sensor, which can transmit tire pressure data over one frequency range (300-400 MHz) and receive data at a substantially lower frequency (125 kHz). As noted herein, RF transmitter can be compatible with any suitable wireless standard/protocol, preferably one optimized for shorter range and low power, such as BLE. However, other protocols including proprietary protocols are anticipated.

Power supply management circuits 544 can control power for the TPMS_L sensor 502 as provided by a battery 546. In some embodiments, a battery 546 can be the same as, or equivalent to, a conventional TPMS sensor battery, in which case a lifetime of the TPMS_L sensor 502 can be substantially longer than a conventional TPMS sensor.

In this way, a tire pressure sensor can have reduced circuit components and power consumption as compared to conventional tire pressures sensors. Further, a tire pressure sensor can wirelessly transmit and receive according to a lower range and lower power wireless standard, as compared to conventional tire pressure sensors. Consequently, an overall bill of materials (BOM) cost of a TPMS_L sensor can be lower than a conventional sensor. In addition or alternatively, there may be additional space for more sensors (e.g., MEMs type sensors) for other data collection. That is, embodiments can provide tire pressure sensors of lower cost, lower power consumption, or greater features, as compared to conventional approaches.

In this way, some embodiments can include removing any computation and storage capabilities from tire pressure sensor modules to create a "lite" version of a TPMS sensor.

Figure 6:
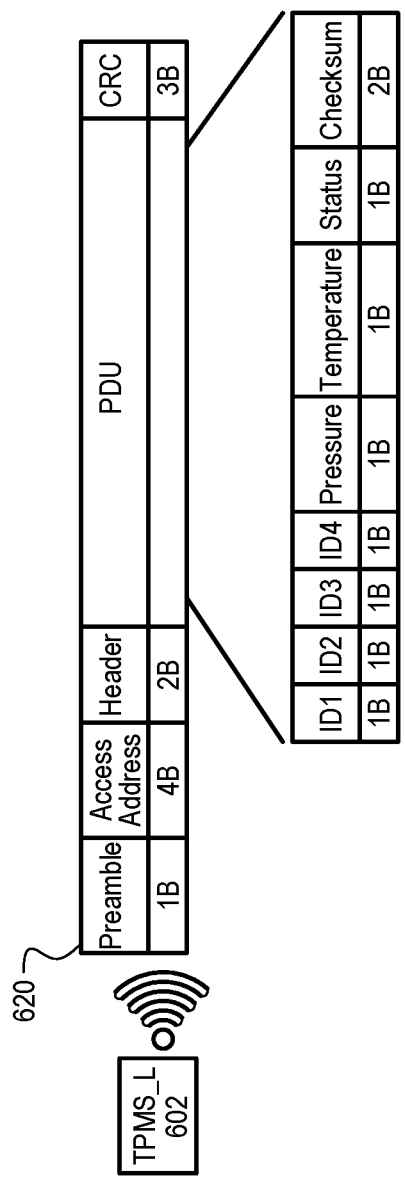
FIG. 6 is a diagram showing a wireless transmission from a TPMS_L sensor according to an embodiment.

Tire pressure and related data transmitted by a TPMS_L sensor can take any suitable form according to the wireless protocol/standard used. FIG. 6 shows a format for such data according to one embodiment. Such a format can be compatible with a BT standard. Sensor data 620 transmitted by a TPMS_L sensor 602 can include various fields, including a preamble, access address, header, protocol data unit (PDU) and error detection code (CRC). Possible byte sizes are shown for each field.

A PDU can include tire pressure and related data, including identification values for the TPMS_L sensors (ID1 to ID4), a pressure value, temperature value, status value and checksum. In some embodiments, a pressure value and temperature value can be raw values, which can be values that have not been subject to computation operations (e.g., calibration). In some embodiments, a pressure value can be subject to subsequent processing before being forwarded to a central TPMS node. Such processing can utilize the temperature value.

It is understood that the format shown in FIG. 6 is but one embodiment. Other embodiments can include any other suitable format, including proprietary formats.

In this way, a wirelessly transmitted packet can include an ID value identifying a tire pressure sensor as well as digital tire pressure and related data for further data processing.

Figure 7:
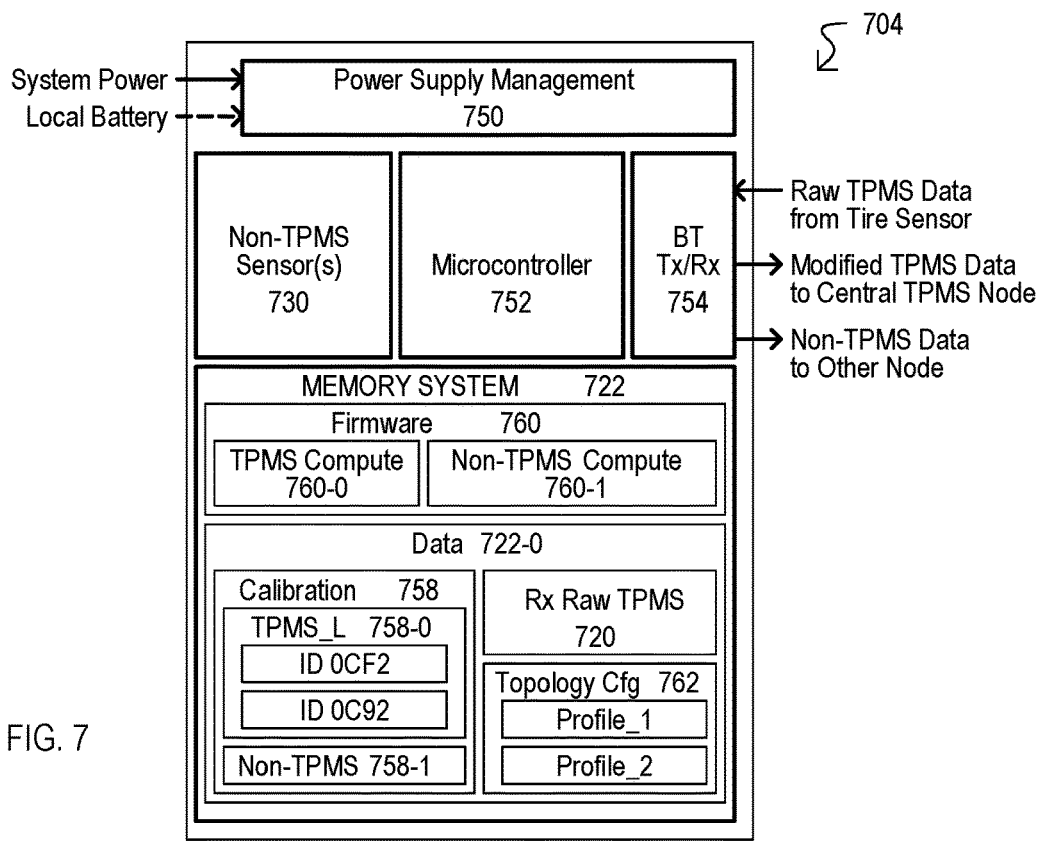
FIG. 7 is a block diagram of an intermediate device according to an embodiment.

FIG. 7 shows an intermediate device 704 according to an embodiment. An intermediate device 704 can include a power supply management section 750, one or more non-TPMS sensors 730, MCU 752, BT circuits 754 and a memory system 722. Power supply management section 750 can control power for an intermediate device 704. An intermediate device 704 can receive power from a system (e.g., vehicle system power), a local battery, or a combination of both.

Non-TPMS sensor(s) 730 can include sensors that perform functions other than tire pressure measurement. Such functions can include any of those described herein or equivalents. MCU 752 can execute various functions of an intermediate device, including those embodied in firmware 760. BT circuits 754 can receive raw TPMS data from a TPMS_L sensor. As noted herein, raw TPMS data can be tire pressure and related data that can be processed further prior to being received at a central TPMS node. BT circuits 754 can also transmit modified TPMS data directly, or indirectly, to a central TPMS node. Modified TPMS data can be tire pressure generated by executing one or more computations on raw TPMS data. In the embodiment shown, BT circuits 754 can also transmit non-TPMS data to another node. Non-TPMS data can be data generated by executing computations on data generated by non-TPMS sensor(s) 730.

A memory system 722 can include storage for various data values 722-0 as well as storage for code 760 executable by MCU 752 (e.g., firmware). Stored values 722-0 can include any suitable values, including but not limited to: tire pressure and related data 720 received from one or more TPMS_L sensors, calibration data 758 and topology (e.g., profile) configuration data 762. Received tire pressure and related data 720 can include raw tire pressure readings generated from sensors as well other associated data for computing a final tire pressure values (e.g., temperature).

Calibration data 758 can include values for computing sensor values. Intermediate device 704 can include calibration data for generating tire pressure values 758-0 as well as non-tire pressure values 758-1. In some embodiments, an intermediate device 704 can receive raw tire pressure data from more than one TPMS_L sensor, depending upon topology. Accordingly, a memory system 722 can store calibration data (or any other data for generating a tire pressure value) for more than one TPMS_L sensor (two shown as ID 0CF2, ID 0C92). Calibration data 758 can further include non-tire pressure calibration data 758-1 which can include calibration data (or any other data) for generating a non-tire pressure sensor value.

Topology configuration data 762 can enable an intermediate device 704 to switch roles in a vehicle system according to a profile. Such switching can be based on vehicle state, and can be dynamic or established by a vehicle user. Topology configuration data 762 can indicate which other devices intermediate device 704 can communicate with (e.g., which TPMS_L sensors) as well as how such communications should take place (e.g., frequency of receiving/transmitting data). Topology configuration data 762 can also establish a role of the intermediate device 704 in a system (e.g., master, slave, peer), as well as include configuration data that can be forwarded to other devices. While FIG. 7 shows topology configuration data 720 for two profiles (Profile_1, Profile_2), other embodiments can include data for a greater number of profiles, or just one profile. In some embodiments, topology configuration data 720 can be received from vehicle controller, including during firmware-over-the-air (FOTA) type updates.

Instructions 760 can include any suitable instructions that allow the MCU 752 to perform the various functions of the intermediate device 704. Such functions can include tire pressure computation functions 760-0 as well as non-tire pressure sensor computation functions 760-1. A tire pressure computation function 760-0 can use stored raw tire pressure data 720 and calibration data 758-0 to compute a tire pressure value which can be forwarded to a central TPMS node. A non-tire pressure computation function 760-1 can use values received from other sensors 730-0 and calibration data 758-1 to compute or evaluate on or more other vehicle functions.

While FIG. 7 shows the offloading of tire pressure data storage and computation from a TPMS_L sensor to an intermediate device, alternate embodiments can offload any other computations from other devices in the same fashion. That is, embodiments are not limited to tire pressure applications.

While FIG. 7 shows an intermediate device with a transceiver 754 for receiving and transmitting data, in other embodiments an intermediate device can include other wireless circuits (e.g., WiFi) and/or a wired connection to a vehicle system (e.g., core network).

In this way, an intermediate device can execute data storage and computations for one or more remote sensor devices (e.g., TPMS_L sensor), as well as store configuration data for establishing and/or changing connections to such remote sensor devices.

Figure 8:
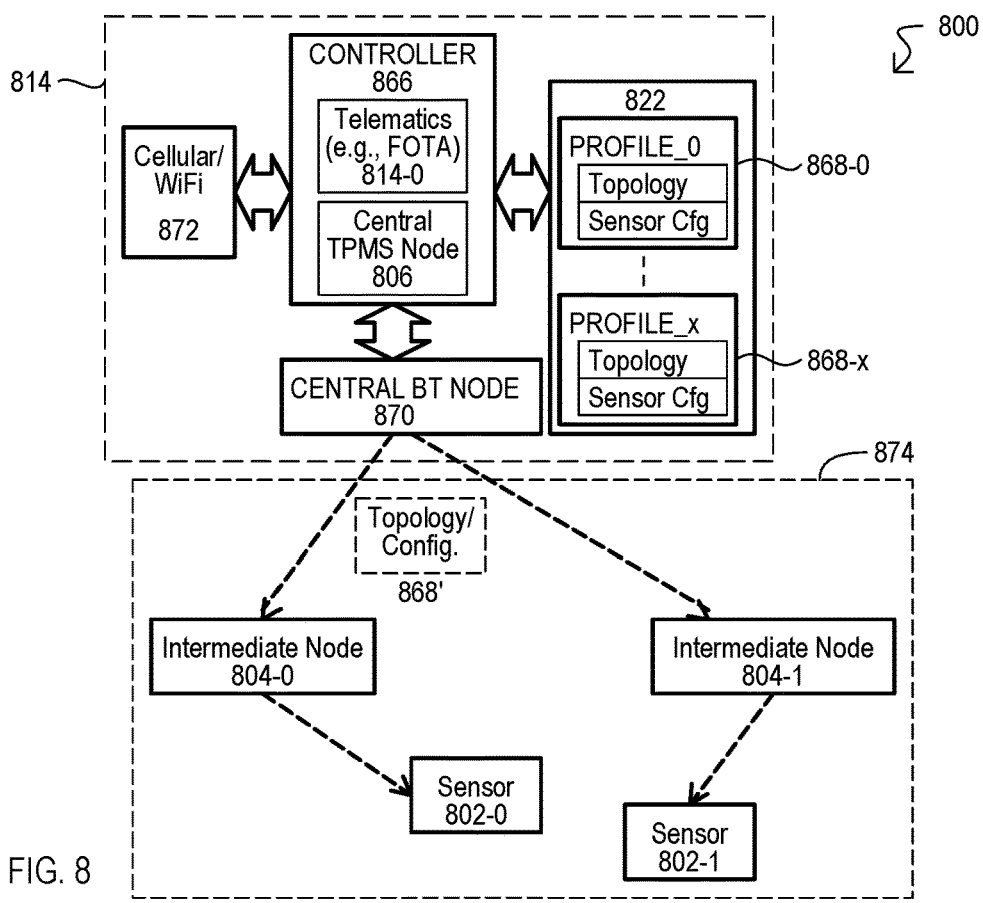
FIG. 8 is a diagram showing a vehicle system that can update sensor and device topology according to an embodiment.

FIG. 8 is a diagram of a vehicle system 800 according to another embodiment. FIG. 8 shows a system 800 in which topology configuration data can be used to alter connections between wireless devices in vehicle network. A system 800 can include a central control node 814 and a vehicle sensor/device network 874. A central node 814 can include a controller 866, a memory system 822, a wireless sub-system 872 and a central BT node 870. A controller 866 can control operations of a vehicle, and can include a telematics system 814-0 and central TPMS node 806. A telematics system 814-0, in conjunction with wireless sub-system 872, can communicate with other remote systems to relay vehicle data and to receive data for the vehicle. In some embodiments, a telematics system 814-0 can receive data for one or more vehicle operating profiles (868-0 to 868-x) which can be stored in memory system 822. A central TPMS node 806 can evaluate and/or display received tire pressure values as described herein and equivalents.

A memory system 822 can store data for the vehicle, including profile data (868-0 to 868-x). In the embodiment shown, profile data can include topology data and sensor configuration data. Topology data can indicate how devices of vehicle network 874 are connected to one another. Sensor configuration data can indicate how sensors operate in the topology, including but not limited to: transmission times/windows, transmission power, transmission method (e.g. encoding) and device role. In some embodiments, a system 800 can include data for an initial profile, which can be updated or replaced at a subsequent time by another profile.

A wireless sub-system 872 can enable the system 800 to wirelessly communicate with other systems according to any suitable protocol/standard, including but not limited to: cellular standards, WiFi standards and GPS. A central BT node 870 can enable a central node 814 to communicate with the various devices of network 874. In some embodiments, a central BT node 870 can transmit profile data 868' to configure the network 874. Such profile data 868' can be transmitted to close proximity device (e.g., 804-0/1), and then forwarded by such close proximity devices to other devices (e.g., 802-0/1).

A device/sensor network 874 can include devices that can wirelessly communicate, and in some embodiments can be a wireless network for lower power, lower transmission range applications, such as BLE, as but one example. A flow of profile configuration information can go from intermediate devices (804-0/1) to corresponding sensor devices (802-0/1). In some embodiments, sensor devices 802-0/1 can be TPMS_L sensors, as described herein and equivalents.

In this way, a central node of a vehicle can receive and store profile data, and forward such profile data to a sensor/device network of a vehicle to alter the network. According to embodiments, a wireless device/sensor network of a vehicle can be configured into different profiles to change the operation of the network. In some embodiments, one or more features of the network can be improved and/or optimized. Such features can include, but are not limited to: distribution of computing functions, lifetime of battery powered sensors, overall vehicle power consumption, redundancy or overall robustness of sensor reporting, or distribution of transmissions for overall airtime. While profiles can be established with expert systems, or customized by or for users. In some embodiments profiles can be generated with artificial intelligence systems.

Figure 9A:
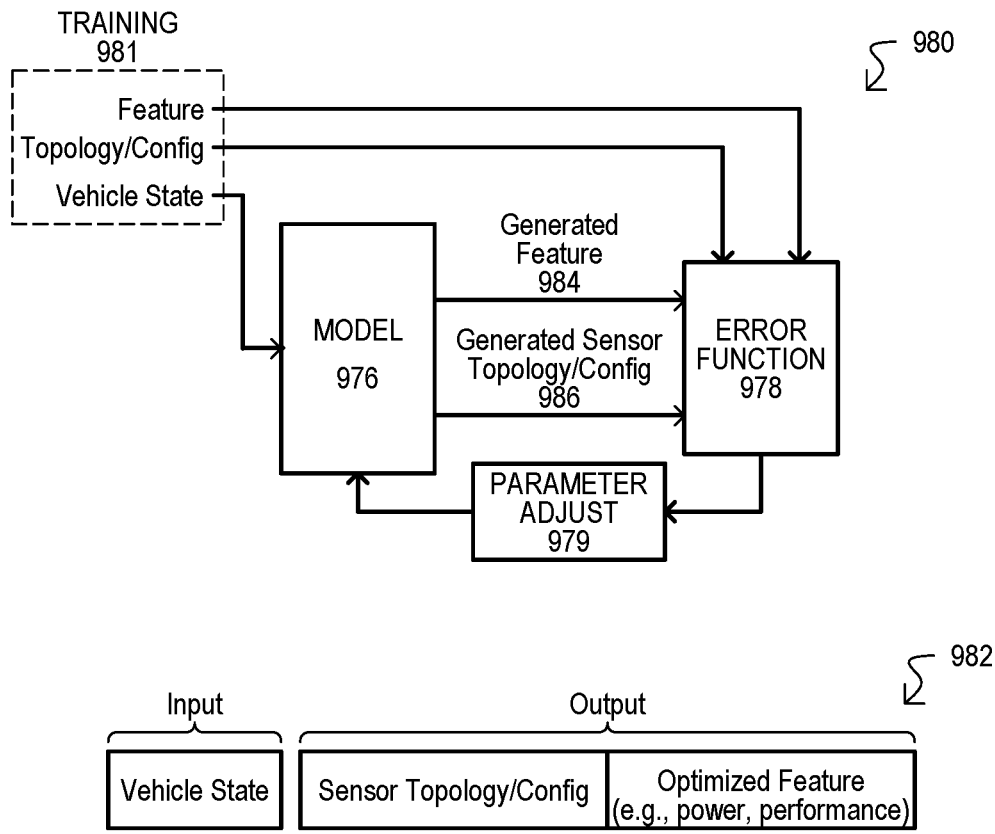
FIGS. 9A and 9B are diagrams showing an artificial intelligence system for generating sensor/device configurations/topologies according to embodiments.
Figure 9B:
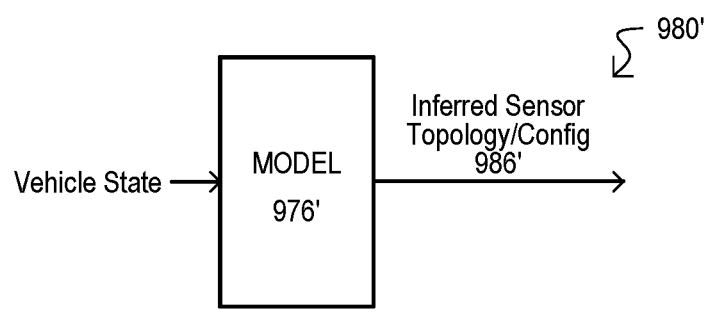

FIGS. 9A and 9B are block diagrams of a system 980 for generating profile settings according to an embodiment. FIG. 9A shows a system 980 in a training phase. A system 980 can include a model 976, error function 978 and parameter adjust section 979. A model 976 can be a learning model, including any suitable neural network, for example. A model 976 can generate output values 984/986 in response to training data 981. Model 976 can vary how it generates output values according to adjustable parameters (e.g., neuron weights). In the embodiment shown, model 976 can be trained with training data sets that include inputs and outputs. FIG. 9A shows an example of a training data value 982. Training data value 982 can include a vehicle state as an input value, while output values can be a sensor topology and/or configuration, as well as one or more features to be improved and/or optimized (e.g., power, performance, airtime use, computation distribution).

An error function 978 can compare output values 984/986 from model 976 with training output values, to generate an error value. An error function 978 can base error on the desired feature for improvement/optimization. Parameter adjust section 979 can adjust parameters of model 976 in response to error values generated by error function 978. Such parameter adjustments can be made to reduce the error (e.g., improve desired feature) and can take any suitable form, such as a version of gradient descent in the case of some neural network model.

Vehicle state information can take any suitable form, including but not limited to: vehicle operation recorded by sensors, a particular driver, driver demographics, and/or a geolocation of a vehicle. Sensor topologies/configuration can include any of those described herein and equivalents, including the offloading of storage and computation for a set of sensors onto one or more other (i.e., intermediate) devices. Training data can be derived from any suitable source, including data acquired for other populations/vehicles, as well as historical data for a driver or particular vehicle.

FIG. 9B shows an operation for generating a sensor topology/configuration 986' for a given vehicle state. A system 980' can include a model 976' after training. Parameters of model 976' have been learned to generate an inferred sensor topology/configuration 986' from a given vehicle state that can provide one or more desired features, as described herein and equivalents.

All or a portion of systems 980/980' can be located on a vehicle or remote from a vehicle (e.g., a server system). In one embodiment of the latter case, a system 980' can receive state data from a vehicle, generate sensor topology/configuration data, and then transmit such generated sensor topology/configuration data to a vehicle.

In this way, a system can generate sensor configuration and/or topology data in response state data of a vehicle. Such generated sensor configuration/topology data can be provided to improve or optimize one or more feature for the vehicle. In some embodiments, such a system can include an artificial intelligence system.

According to embodiments, Bluetooth nodes (or nodes according to other wireless standards) of a vehicle can have different utilization profiles. For example, while parked, PaaK systems may have priority operation around passive entry functionality, but while driving, such resources can be freed up. This can allow for components of such nodes (e.g., BT radios, memory, and MCUs) to be utilized for other functionality, such as the storage, transmission and computation of sensor data, including BT TPMS data.

With such an architecture in place, tire pressure monitoring systems can remove functionality from a conventional onboard module (e.g., TPMS sensor) and allow the onboard modules to transmit data without performing functions distributed to other nodes (e.g., computation, storing data, etc.).

Figure 10A:
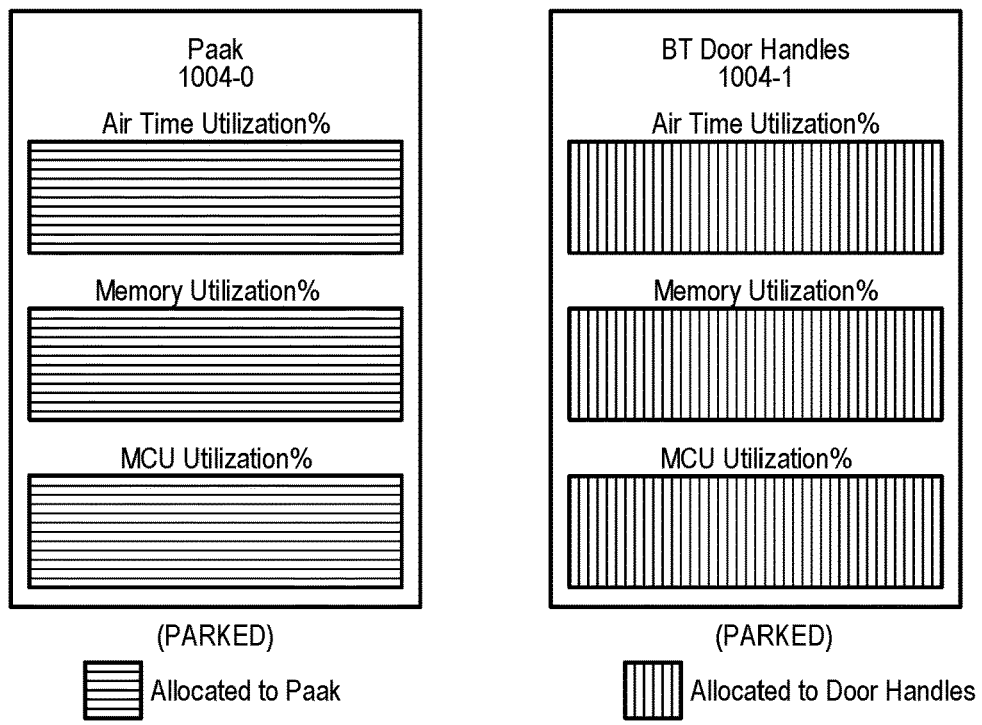
FIGS. 10A and 10B are diagrams showing different utilization profiles for intermediate devices according to an embodiment.
Figure 10B:
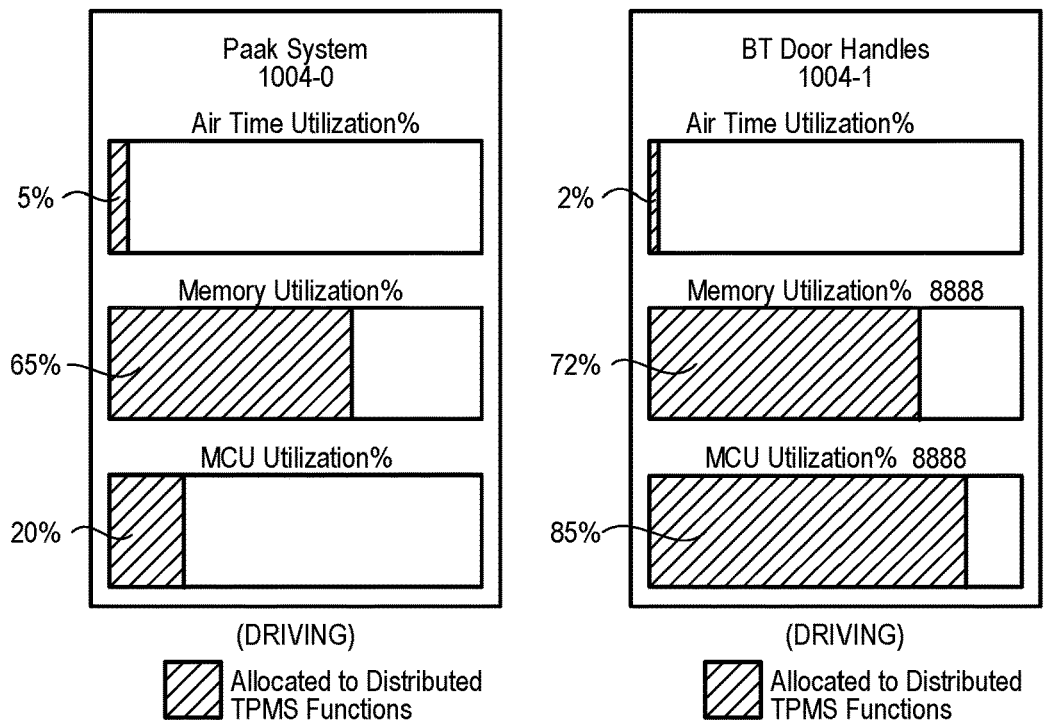

FIGS. 10A and 10B are diagrams showing different utilization profiles for non-TPMS BT nodes of a vehicle. Such non-TPMS BT nodes can be examples of intermediate devices as described herein. FIGS. 10A and 10B show a PaaK device 1004-0 and a BT door handle 1004-1. Each device 1004-0/1 can have an airtime utilization, memory utilization, and MCU utilization.

FIG. 10A shows utilization profiles for devices 1004-0/1 when a vehicle is parked. In the embodiment shown, in the parked state, a PaaK device 1004-0 can dedicate its resources to PaaK functions. Similarly, BT door handles 1004-1 can dedicate resources to door handle sensing functions.

FIG. 10B shows utilization profiles for devices 1004-0/1 when a vehicle is driving. Resources can be dedicated for TPMS related functions. In some embodiments, air time (5% for the Paak device, 2% for the BT door handles) can be dedicated to receiving raw tire pressure and related data as well as transmitting computed tire pressure values. Memory (65% for the Paak device, 72% for the BT door handles) can be utilized to store received raw tire pressure sensor data as well as execute operations needed to compute a tire pressure value to be transmitted. MCU (20% for the Paak device, 85% for the BT door handles) resources can be utilized for executing the various TPMS operations described, such as receiving and storing raw TPMS data, computing tire pressure values and transmitting tire pressure values. It is understood that the percentage values of FIG. 10B are provided by way of example and should not be construed as limiting. Further, utilization profiles can be changed, including dynamically.

In this way, devices in a vehicle network can have different utilization profiles depending upon a vehicle state, including profiles where operations are executed on sensor data received from other devices, such as tire pressure sensors.

While the devices and systems described herein have disclosed various methods according to embodiments, additional methods will now be described with reference to flow diagrams.

Figure 11:
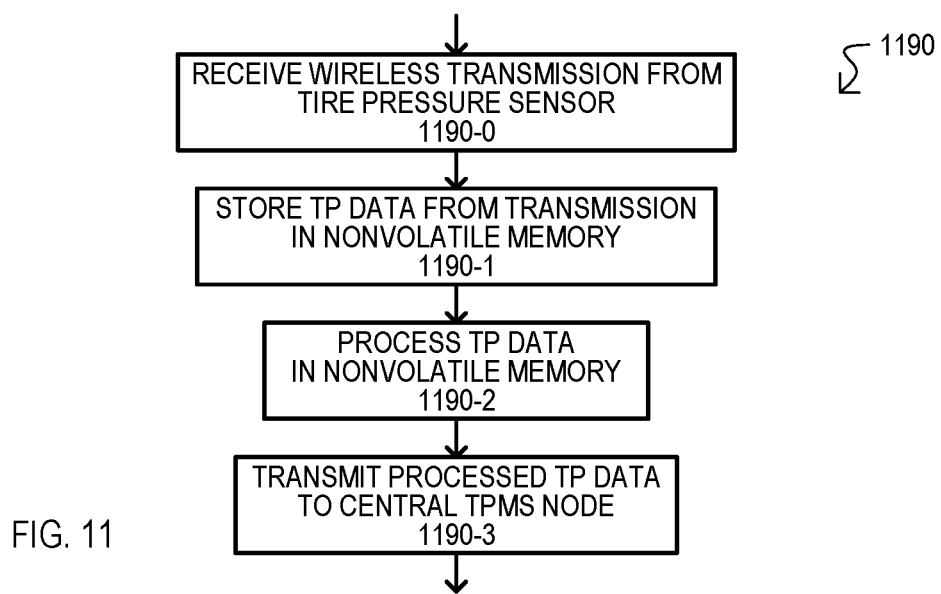
FIG. 11 is a flow diagram of a method for relaying tire pressure sensor data according to an embodiment.

FIG. 11 is a flow diagram of a method 1190 according to an embodiment. In some embodiments, a method 1190 can be executed by an intermediate device as described herein or equivalents. A method 1190 can include receiving a wireless transmission from a tire pressure sensor 1190-0. Such an action can include receiving data from any suitable tire pressure sensor, including a TPMS_L sensor as described herein and equivalents. Such a transmission can depart from conventional approaches in that the transmission can include raw tire pressure data.

Tire pressure (TP) data from a received transmission can be stored in non-volatile memory 1190-1. Such an action can include an intermediate device storing received tire pressure data. TP data stored in nonvolatile memory can then be processed 1190-2. Such an action can include any of those described herein and equivalents. Processed TP data can be transmitted to a central TPMS node 1190-3.

In this way, tire pressure data can be received from a sensor, stored in a nonvolatile fashion, and forwarded to a central TPMS node.

Figure 12:
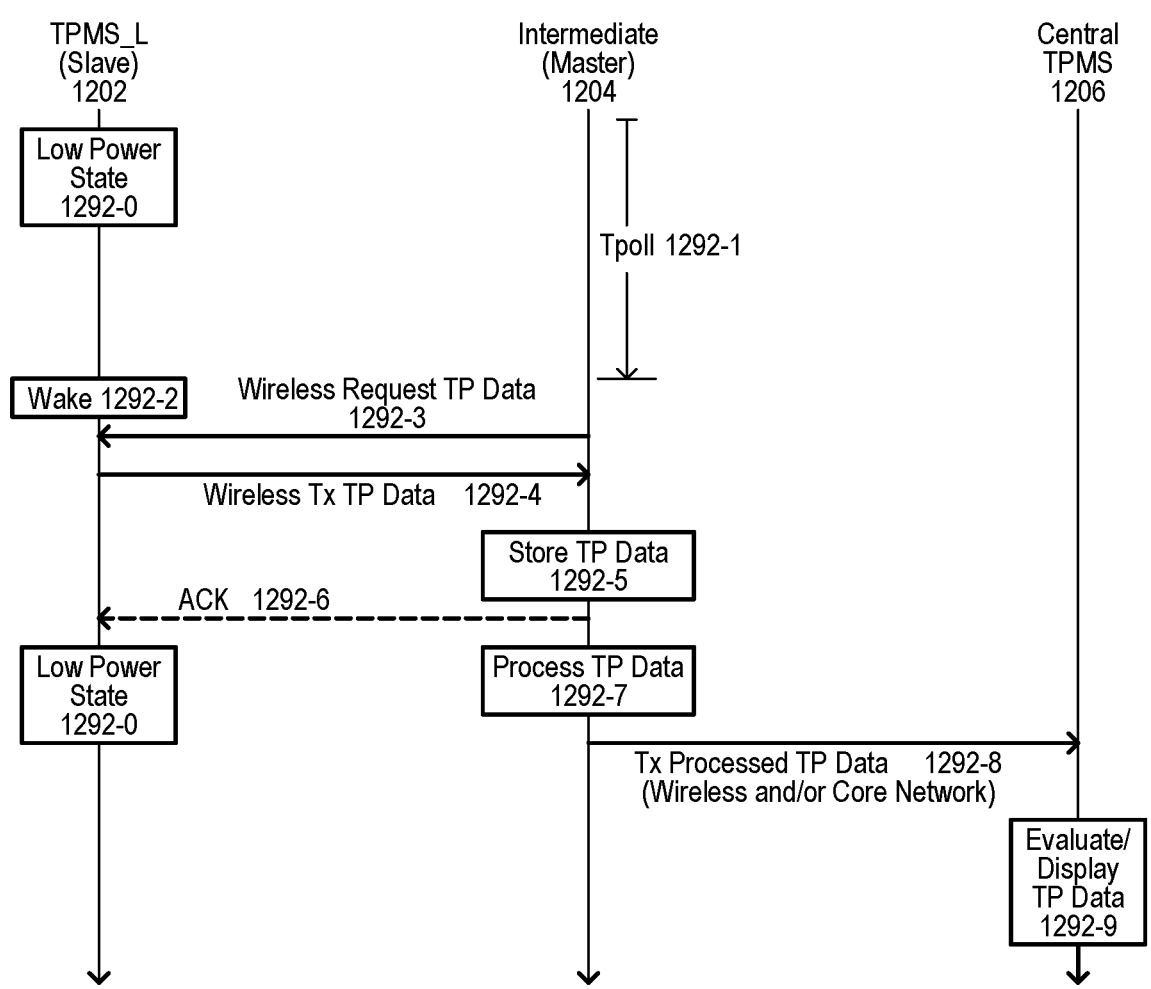
FIG. 12 is a diagram showing operations of a vehicle sensor system according to an embodiment.

While embodiments can include any suitable topology for distributing the storage and computation of sensor data throughout a vehicle system, in some embodiments tire pressure sensors can be slave devices in a system, transmitting tire pressure data upon request. FIG. 12 is a diagram showing one such embodiment.

FIG. 12 shows communications in a system 1292 that includes a TPMS_L sensor 1202, an intermediate device 1204 and a central TPMS node 1206. A TPMS_L sensor 1202 can take the form of embodiments herein and equivalents.

According to a wireless communication protocol, TPMS_L sensor 1202 can be a slave device while intermediate device 1204 can be a master device. TPMS_L sensor 1202 can be configured to be in a low power state 1292-0 for a polling interval Tpoll 1292-1. At the end of the interval, TPMS_L sensor 1202 can wake 1292-2 (e.g., enter a fully operational state) to receive a request 1292-3 for tire pressure data from an intermediate device 1204.

In response to an intermediate device request 1292-3, TPMS_L sensor 1292-2 can transmit TP data 1292-4. Such an action can take the form of any of those described herein, including the transmission of raw tire pressure data. An intermediate device 1204 can receive and store the TP data 1292-5. In some embodiments, intermediate device 1204 can return an acknowledgement 1292-6. A TPMS_L sensor 1202 can then return to a low power state 1292-7.

In the embodiment shown, after storing TP data 1292-5 an intermediate device 1204 can process such data. An intermediate device 1204 can transmit resulting processed TP data 1292-8 to a central TPMS node 1206. Such transmission can be direct or indirect (e.g., via one or more other devices). Further, transmission of processed TP data 1292-8 can be via a wireless connection, a wired connection or a combination thereof, including through a core network.

A central TPMS node 1206 can receive processed tire pressure data for all tires of a vehicle, and can perform any suitable functions in response thereto, including but not limited to evaluating tire pressure levels and/or display tire pressure data 1292-9.

In this way, TPMS_L devices can be slave devices wirelessly transmitting tire pressure data in response to requests from intermediate devices that relay such data to a central TPMS node.

Figure 13:
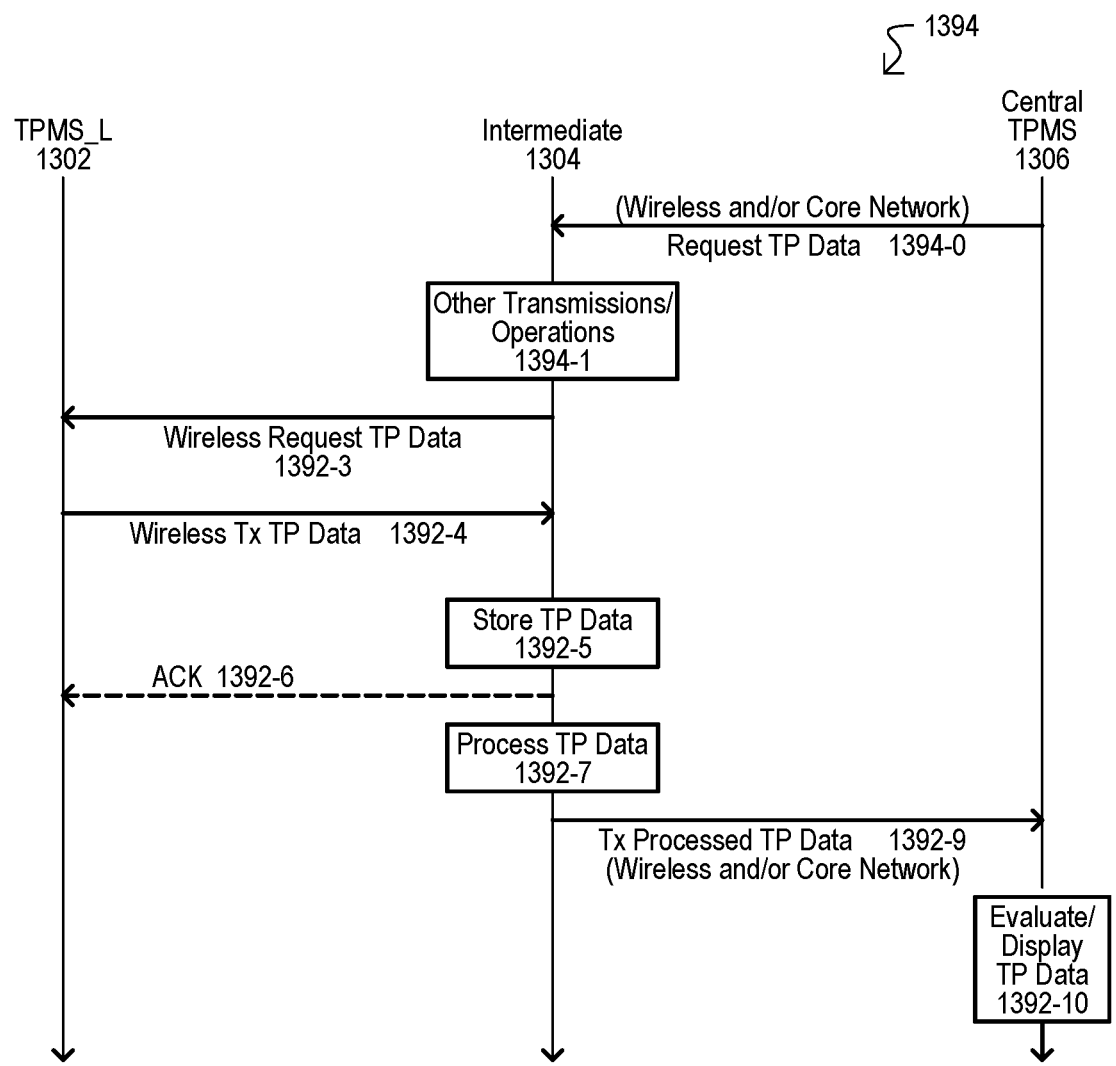
FIG. 13 is a diagram showing operations of a vehicle sensor system according to another embodiment.

Embodiments can also include topologies in which a central TPMS node can request tire pressure data via one or more intermediaries. FIG. 13 is a diagram showing one such embodiment.

FIG. 13 shows communications in a system 1394 that includes a TPMS_L sensor 1302, an intermediate device 1304 and a central TPMS node 1306. Such devices can take the form of embodiments herein and equivalents. A central TPMS node 1306 can make a request for TP data 1394-0 to an intermediate device 1304. Such a request can be direct or indirect. Further, transmission of request 1394-0 can be via a wireless connection, a wired connection or a combination thereof, including through a core network of the vehicle.

In some embodiments, an intermediate device 1304 can perform other operations and/or transmissions 1394-1. That is, upon receiving a request, an intermediate device 1304 can determine when to make a request to a TPMS_L sensor 1302.

A system 1394 can then generally follow communications as shown in FIG. 12, including an intermediate device 1304 wireless requesting TP data 1392-3 from a TPMS_L sensor 1302, TPMS_L sensor 1392-2 transmitting TP data 1392-4, intermediate device 1304 can storing/processing TP data 1392-5/7 (an optionally returning an ACK 1392-6). Intermediate device 1304 can transmit resulting processed TP data 1392-9 to a central TPMS node 1306, and a central TPMS node 1306 can perform any suitable functions in response thereto.

In this way, requests for tire pressure data from a central node can be relayed to wireless tire pressure sensors through one or more intermediate devices.

According to embodiments, connections between devices for relaying vehicle sensor data, as well as operations for such devices can be established according to vehicle profiles. Thus, vehicle sensor operations and topologies can be altered with different profiles. Such changes can be static and/or dynamic. In some embodiments, such profiles can evolve over time, adapting to vehicle states and/or driver states.

Figure 14:
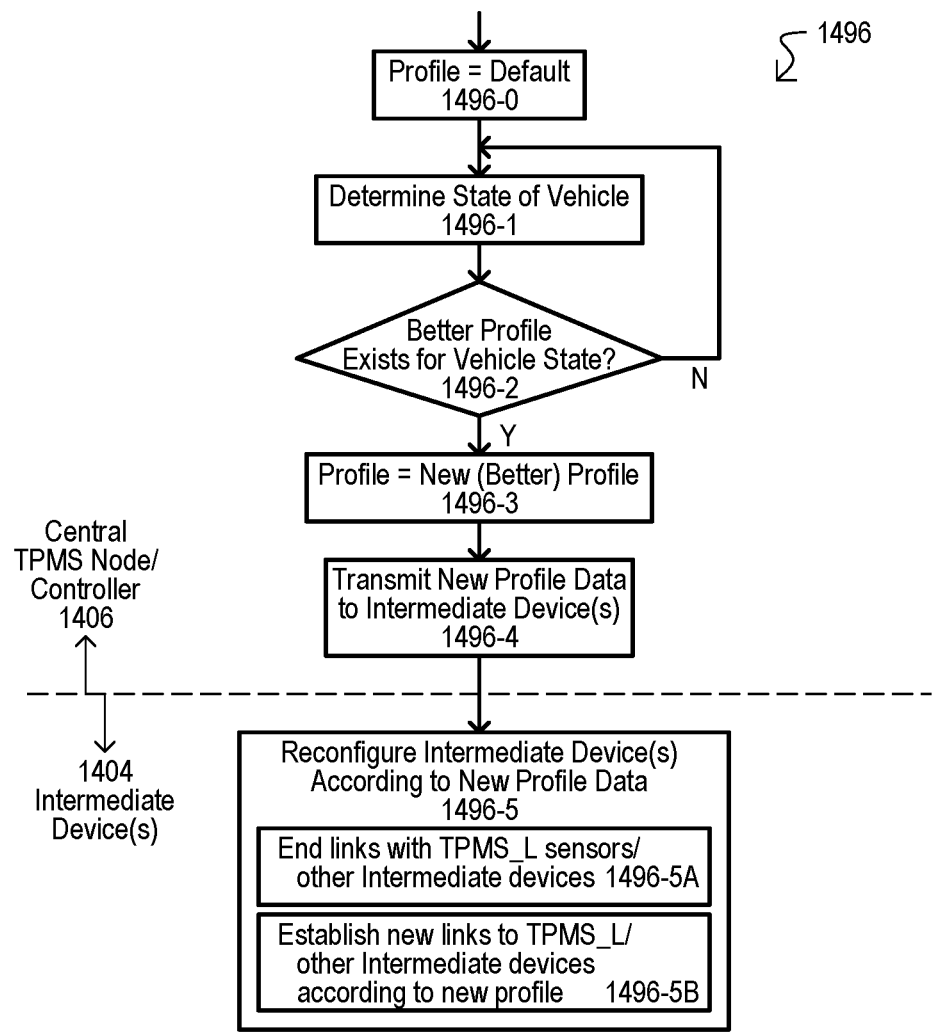
FIG. 14 is a flow diagram of a method for changing a vehicle sensor system profile according to an embodiment.

FIG. 14 is a diagram of a method 1496 of changing profiles of a vehicle according to an embodiment. A method 1496 can include actions executed by a central sensor node (or controller) 1406, as well as actions executed by an intermediate device 1404 in communication with one or more sensors (e.g., tire pressure sensors).

A method 1496 can include a vehicle having a default (e.g., initial) profile 1496-0. Such an initial profile can establish connections between a central sensor node, intermediate nodes and sensors in a vehicle. A state of the vehicle can be determined 1496-1. Such a state can take the form of any of those described herein and equivalents. A method 1496 can determine if a better profile exists for the determined state 1496-2. Such an action can include a vehicle system (e.g., controller) accessing data on other profiles and corresponding performance. Such other profile data can be stored in vehicle and/or accessed from a remote location, such as a server. A "better" profile can be a profile that provides better performance, where performance can include any suitable operational feature of the vehicle, including but not limited to: computation distribution, data storage distribution, power consumption (for individual devices, sub-systems or the system as a whole), sensor data latency or sensor data quality. If a better profile does not exist (N from 1496-2), a method 1496 can continue to determine a state of the vehicle 1496-1.

If a better profile does exist (Y from 1496-2), a profile for the vehicle can be set to the new (better) profile 1496-3. Data for the new profile can then be transmitted to intermediate devices 1496-4. Such an action can include any suitable communication paths of the vehicle, including wired and/or wireless connections.

In response to receiving profile data, an intermediate device can re-configure itself 1496-5, if warranted by the profile. Such an action can include changing its own operations (e.g., sensor functions, communication type/frequency, power states). However, such an action can also include ending current links to TPMS_L sensors or other intermediate devices 1496-5A and/or establishing new links to TPMS_L sensors or other intermediate devices 1496-5B.

In some embodiments, an intermediate device can transmit configuration data and establish links with sensors using the same medium as that used to receive tire pressure data. This is in contrast to conventional TPMS sensors that can receive signals on different (i.e., low frequency) medium than that at which they transmit tire pressure data (i.e., higher frequency).

In this way, in response to different profiles, profile data can flow through a sensor network to reconfigure sensors devices and/or sensor device operations.

Figure 15:
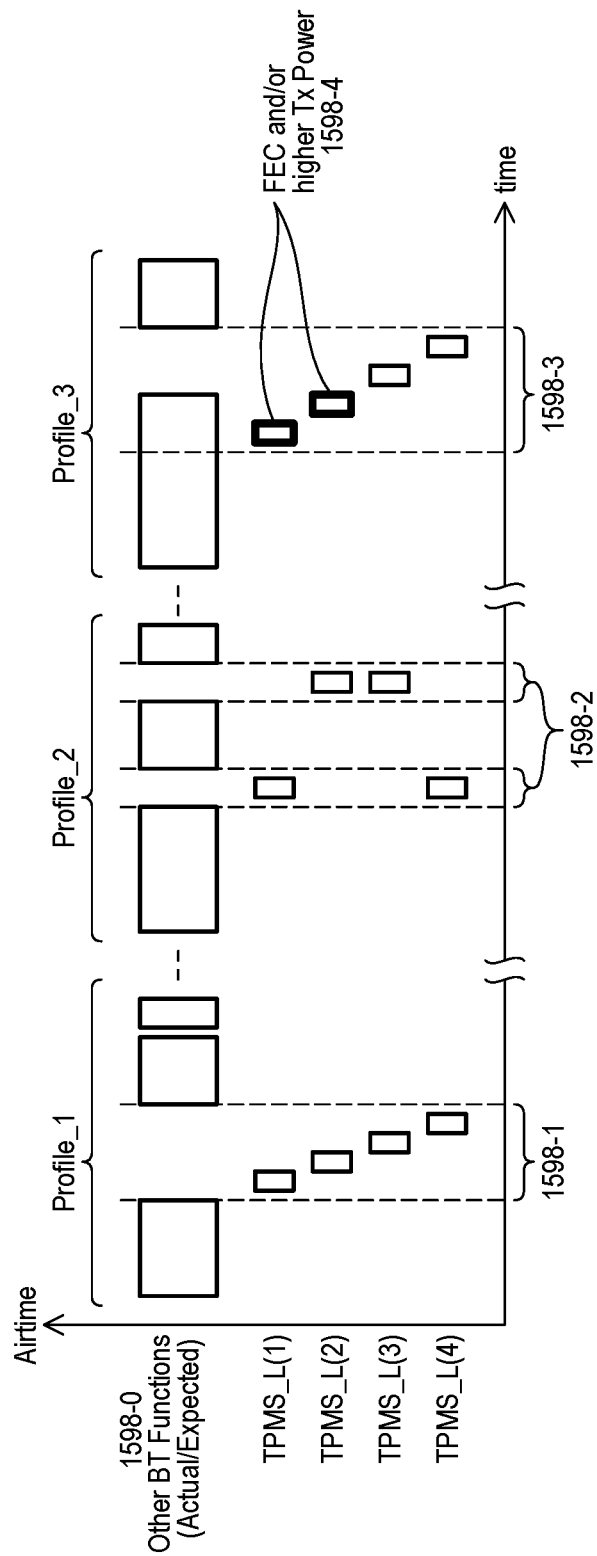
FIG. 15 is a timing diagram showing tire pressure data transmissions for different vehicle profiles according to embodiments.

According to embodiments, transmission of tire pressure data can vary according to different profiles. Different profiles can be established as described herein (e.g., in response to vehicle states). FIG. 15 is a timing diagram showing examples of the transmission of tire pressure data under different profiles.

The vertical axis of FIG. 15 shows wireless operations for four tire pressure sensors (shown as TPMS_L(x), where x is a different tire) as well as other wireless functions 1598-0 (i.e., wireless operation other than tire pressure sensors). In some embodiments, tire pressure sensors can be TPMS_L sensors, and wireless transmissions can be compatible with one or more BT standards (e.g., BLE). In some embodiments, transmitted tire pressure data can be "raw" tire pressure as described herein or equivalents. Other wireless operations 1598-0 can include wireless devices of the vehicle, as well as other interfering wireless devices external to the vehicle. The horizontal axis of FIG. 15 shows transmissions for three different profiles (Profile_1 to Profile_3) over time.

Profile_1 shows a profile in which a tire pressure data transmissions can occur in a window 1598-1 when other wireless devices are not transmitting, not expected to transmit, or have fewer transmissions (e.g., medium less crowded). In other embodiments, all tire pressure sensors can transmit at the same time.

Profile_2 shows a profile in which there can be multiple (in this case two) windows 1508-2 in which a tire pressure data transmissions can occur. Profile_2 also shows how two or more tire pressure sensors can transmit at the same time.

Profile_3 shows a profile in which tire pressure transmissions 1598-3 can overlap with other transmissions. In some embodiments, in such overlapping periods, or other periods in which the medium is or is expected to include a high degree of interfering transmissions, tire pressure data transmissions can have a higher level of reliability 1598-4. Such higher level transmissions can be due to encoding (e.g., forward error correction), transmission power or a combination thereof.

It is understood that FIG. 15 is but exemplary and should not be construed as limiting. In some embodiments, tire pressure data transmission can occur regardless of medium state. It is also understood that tire pressure data can be transmitted in response to requests or unilaterally by the tire pressure sensors (TPMS_L(x)).

In this way, tire pressure sensors can transmit at different times and/or in different ways according to different vehicle profiles.

Embodiments can include methods, devices and systems can include generating analog signals from at least one pressure sensor mounted within a tire; by operation of analog-to-digital conversion (ADC) circuits of the pressure sensor, converting the analog signals into initial tire data; transmitting the initial tire data from the pressure sensor according to a first wireless communication protocol; receiving the initial tire data at a first intermediate device according to the first wireless standard, the intermediate device being disposed outside of the tire; and storing the initial tire data in the first intermediate device; by operation of the first intermediate device, transmitting relayed tire data configured for reception by a central tire monitoring system, the relayed tire data corresponding to the initial tire data.

Embodiments can include methods, devices and systems having storage circuits; sensor circuits configured to sense at least one vehicle state that is not a tire state; communication circuits configured to wirelessly receive digital tire data from at least a first tire pressure sensor according to a first wireless communication protocol, and transmit modified tire data corresponding to the digital tire data configured for reception by a central tire monitoring system. Processing can be included that are configured to generate the modified tire data from the digital tire data.

Embodiments can include methods, devices and systems having a plurality of tire pressure sensors, each configured to sense and wirelessly transmit initial tire data for processing, the initial tire data including at least a tire pressure reading; and a plurality of intermediate devices. Each intermediate device can be configured to determine at least one vehicle state that is not a tire state, receive and store the tire state data from at least one of the tire pressure sensors, and transmit relayed tire data configured for reception by a central tire monitoring system, the relayed tire data generated from the stored tire state data.

Methods, devices and systems according to embodiments can further include tire pressure sensors transmitting tire pressure sensor data according to a Methods, devices and systems according to embodiments can further include tire pressure sensors transmitting initial tire data which can be raw data generated by the ADC circuits of the tire pressure sensor.

Methods, devices and systems according to embodiments can further include, by operation of computation circuits on the first intermediate device, executing at least one arithmetic or logic operation on the initial tire data to generate the relayed tire data.

Methods, devices and systems according to embodiments can further include a first intermediate device is selected from any of a seatbelt sensor, a PaaK sensor, a door handle sensor, a battery management system or an occupancy sensor.

Methods, devices and systems according to embodiments can further include selecting between at least a first and second profile in response to a state of a vehicle determined by at least one other sensor of the vehicle. In some embodiments, in the first profile for the vehicle, initial tire data from a tire pressure sensor can be received and stored at a first intermediate device. In the second profile for the vehicle, initial tire data from the tire pressure sensor can be received and stored at a second intermediate device that is disposed at a different physical location on the vehicle than the first intermediate device. In other embodiments, in the first sensor profile for the vehicle, initial tire data can be received and stored at the first intermediate device in a first time window of a predetermined time period. In the second sensor profile for the vehicle, initial tire data can be received and stored at the first intermediate device in a second time window of the predetermined time period that is different than the first time window.

Methods, devices and systems according to embodiments can further include a tire pressure sensor receiving control data according to the first wireless communication protocol, which can the same wireless communication protocol with which the tire pressure sensor transmits initial tire pressure data.

Methods, devices and systems according to embodiments can further include the communication circuits configured to wirelessly transmit modified tire data according to the first wireless communication protocol, where modified tire pressure data is generated from initial tire data by processing circuits, and initial tire data is received according to the first wireless communication protocol.

Methods, devices and systems according to embodiments can further include communication circuits configured to transmit the modified tire data over a wired connection to a core network of the motor vehicle.

Methods, devices and systems according to embodiments can further include communication circuits configured to, in a first profile configuration wirelessly receive digital tire data from a first tire pressure sensor, and in a second profile configuration, wirelessly receive digital tire data from a second tire pressure sensor and not the first tire pressure sensor.

Methods, devices and systems according to embodiments can further include at least one intermediate devices that wirelessly transmits relayed tire data according to the same communication protocol used by the tire pressure sensors to transmit the initial tire data.

Methods, devices and systems according to embodiments can further include at least one intermediate devices that includes processing circuits configured to execute at least one arithmetic or logic operation on the initial tire data to generate the relayed tire data.

Methods, devices and systems according to embodiments can further include the plurality of sensors and the plurality of intermediate devices that form a mesh network.

Methods, devices and systems according to embodiments can further include a controller device configured to transmit network configuration data according to different profiles to at least the intermediate devices. The intermediate devices can be configured to enable different connections to tire pressure sensors in response to the configuration data of different profiles.

Methods, devices and systems according to embodiments can further include a controller device configured to generate different configuration data for different profiles in response to different states of a vehicle.

Methods, devices and systems according to embodiments can further include each of the tire pressure sensors transmitting the initial tire data without storing the initial tire data in nonvolatile memory.

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

Similarly, it should be appreciated that in the foregoing description of exemplary embodiments of the invention, various features of the invention are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claims require more features than are expressly recited in each claim. Rather, inventive aspects lie in less than all features of a single foregoing disclosed embodiment. Thus, the claims following the detailed description are hereby expressly incorporated into this detailed description, with each claim standing on its own as a separate embodiment of this invention.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method, comprising:
   generating analog signals from at least one pressure sensor mounted within a tire of a vehicle;
   by operation of analog-to-digital conversion (ADC) circuits of the pressure sensor, converting the analog signals into initial tire data;
   transmitting the initial tire data from the pressure sensor according to a first wireless communication protocol;
   receiving the initial tire data at a first intermediate device according to the first wireless communication protocol, the intermediate device being disposed outside of the tire and on the vehicle; and
   storing the initial tire data in the first intermediate device;
   by operation of the first intermediate device,
      transmitting relayed tire data according to the first wireless communication protocol and configured for reception by a central tire monitoring system on the vehicle, the relayed tire data corresponding to the initial tire data.

2. The method of claim 1, wherein:
   the first wireless communication protocol is compatible with at least one Bluetooth standard.

3. The method of claim 1, wherein:
   the initial tire data is raw data generated by the ADC circuits.

4. The method of claim 1, wherein:
   by operation of computation circuits on the first intermediate device, executing at least one arithmetic or logic operation on the initial tire data to generate the relayed tire data.

5. The method of claim 1, wherein:
   the first intermediate device is selected from the group of: a seatbelt sensor, a phone-as-a-key (PaaK) sensor, a door handle sensor, a battery management system and an occupancy sensor.

6. The method of claim 1, further including:
   selecting between at least a first and second profile in response to a state of a vehicle determined by at least one other sensor of the vehicle;
   in the first profile for the vehicle, receiving and storing the initial tire data from the at least one pressure sensor at the first intermediate device; and
   in the second profile for the vehicle, receiving and storing the initial tire data from the at least one pressure sensor at a second intermediate device that is disposed at a different physical location on the vehicle than the first intermediate device.

7. The method of claim 1, further including:
   selecting between at least a first and second profile in response to a state of a vehicle determined by at least one other sensors of the vehicle;
   in the first profile for the vehicle, receiving and storing the initial tire data at the first intermediate device in a first time window of a predetermined time period; and
   in the second profile for the vehicle, receiving and storing the initial tire data at the first intermediate device in a second time window of the predetermined time period that is different than the first time window.

8. The method of claim 1, further including:
   the pressure sensor receiving control data according to the first wireless communication protocol.

9. A sensor device for a motor vehicle, comprising:
   storage circuits;
   sensor circuits configured to sense at least one vehicle state that is not a tire state;
   communication circuits configured to
      wirelessly receive digital tire data from at least a first tire pressure sensor according to a first wireless communication protocol, and
      transmit modified tire data corresponding to the digital tire data configured for reception by a central tire monitoring system separate from the sensor device and on the motor vehicle; and
   processing circuits configured to generate the modified tire data from the digital tire data.

10. The sensor device of claim 9, wherein:
    the communication circuits are configured to wirelessly transmit the modified tire data according to the first wireless communication protocol.

11. The sensor device of claim 9, wherein:
    the communication circuits are configured to transmit the modified tire data over a wired connection to a core network of the motor vehicle.

12. The sensor device of claim 9, wherein:
    the communication circuits configured to
       in a first profile configuration, wirelessly receive digital tire data from the first tire pressure sensor, and
       in a second profile configuration, wirelessly receive digital tire data from a second tire pressure sensor and not the first tire pressure sensor.

13. The sensor device of claim 9, wherein:
    the sensor device is selected from the group of: a seatbelt sensor, a phone-as-a-key (PaaK), sensor, a door handle sensor, a battery management system and an occupancy sensor.

14. A system, comprising:
    a plurality of tire pressure sensors, each configured to sense and wirelessly transmit initial tire data for processing, the initial tire data including at least a tire pressure reading; and
    a plurality of intermediate devices, each configured to
       determine at least one vehicle state that is not a tire state,
       receive and store tire state data from at least one of the tire pressure sensors, and
       transmit relayed tire data configured for reception by a central tire monitoring system, the relayed tire data generated from the stored tire state data; wherein
       at least one of the intermediate devices includes processing circuits configured to execute at least one arithmetic or logic operation on the initial tire data to generate the relayed tire data.

15. The system of claim 14, wherein:
    at least one of the intermediate devices wirelessly transmits the relayed tire data according to the same communication protocol used by the tire pressure sensors to transmit the initial tire data.

16. The system of claim 14, wherein:
    the plurality of sensors and the plurality of intermediate devices form a mesh network.

17. The system of claim 14, further including:
    a controller device configured to transmit network configuration data according to different profiles to at least the intermediate devices; and the intermediate devices are configured to enable different connections to tire pressure sensors in response to the configuration data of different profiles.

18. The system of claim 17, further including:

a controller device configured to generate different configuration data for the different profiles in response to different states of a vehicle; wherein the different states of the vehicle determined by at least one other sensor of the vehicle.

19. The system of claim 18, further including:

each of the tire pressure sensors transmits the initial tire data without storing the initial tire data in nonvolatile memory.

* * * * *